US012624990B2

(12) United States Patent
    Kramer et al.

(10) Patent No.: US 12,624,990 B2
(45) Date of Patent: May 12, 2026

(54) SYSTEM AND METHOD FOR FOCAL POSITION CONTROL

(71) Applicant: Primes GmbH Messtechnik für die Produktion mit Laserstrahlung, Pfungstadt (DE)

(72) Inventors: Reinhard Kramer, Pfungstadt (DE); Otto Märten, Dreieich (DE); Stefan Wolf, Groß-Gerau (DE); Johannes Roßnagel, Mainz-Kastel (DE); Roman Niedrig, Berlin (DE)

(73) Assignee: Primes GmbH Messtechnik für die Produktion mit Laserstrahlung, Pfungstadt (DE)

( * ) Notice: Subject to any disclaimer, the term of this patent is extended or adjusted under 35 U.S.C. 154(b) by 1126 days.

(21) Appl. No.: 17/619,904

(22) PCT Filed: Jun. 16, 2020

(86) PCT No.: PCT/DE2020/000134
    § 371 (c)(1),
    (2) Date: Dec. 16, 2021

(87) PCT Pub. No.: WO2020/253898
    PCT Pub. Date: Dec. 24, 2020

(65) Prior Publication Data
    US 2022/0341778 A1      Oct. 27, 2022

(30) Foreign Application Priority Data

Jun. 21, 2019   (DE) ..................... 10 2019 004 337.5

(51) Int. Cl.
    B23K 26/70      (2014.01)
    B23K 26/046     (2014.01)
    (Continued)

(52) U.S. Cl.
    CPC .......... G01J 1/4257 (2013.01); B23K 26/046 (2013.01); B23K 26/0648 (2013.01);
    (Continued)

(58) Field of Classification Search
    CPC ...... G01J 1/4257; G01J 1/0414; G01J 1/0411; G01J 1/0425; G01J 1/0437; G01J 1/044; G01J 1/58; G01J 2001/4261
    (Continued)

(56) References Cited

U.S. PATENT DOCUMENTS

| | | | | |
|---|---|---|---|---|
| 2004/0012844 A1* | 1/2004 | Ohtsuki | ............. | B23K 26/0643 |
| | | | | 359/341.1 |
| 2007/0170159 A1* | 7/2007 | Fukumitsu | ......... | B23K 26/0006 |
| | | | | 219/121.68 |

(Continued)

FOREIGN PATENT DOCUMENTS

| | | | |
|---|---|---|---|
| DE | 102007029923 A1 | 1/2009 | |
| DE | 102010053323 B3 | 5/2012 | |

(Continued)

OTHER PUBLICATIONS

International Search Report and Written Opinion for Int. App. No. PCT/DE2020/000134, mailed Oct. 8, 2020.

*Primary Examiner* — Chris Q Liu
(74) *Attorney, Agent, or Firm* — McDonnell Boehnen Hulbert & Berghoff LLP

(57) ABSTRACT

The present disclosure relates to a beam analysis device for determining a light beam state, e.g., determining the focal position of a light beam, where the device has a partial beam imaging device having at least one first selection device for forming a first partial beam from a first partial aperture region of the first measurement beam, and an imaging device for imaging the first partial beam for generating a first beam spot onto a detector unit having a spatially-resolving detec-
(Continued)

tor. The beam analysis device also can have an evaluation unit for processing the signals of the detector unit, for determining a lateral position $(a_1)$ of the first beam spot, and for determining changes in the lateral position $(a_1, a_1')$ of the first beam spot over time. An optical system for focal position control with a laser optics and with a beam analysis device. Additionally, the disclosure relates to a corresponding beam analysis method and methods for focal position control of a laser optics and for focal position tracking of a laser optics.

14 Claims, 28 Drawing Sheets

(51) Int. Cl.
| | |
|---|---|
| *B23K 26/064* | (2014.01) |
| *B23K 26/073* | (2006.01) |
| *G01J 1/04* | (2006.01) |
| *G01J 1/42* | (2006.01) |
| *G02B 7/02* | (2021.01) |
| *G02B 7/28* | (2021.01) |

(52) U.S. Cl.
CPC .......... *B23K 26/073* (2013.01); *B23K 26/705* (2015.10); *G01J 1/0411* (2013.01); *G02B 7/02* (2013.01); *G02B 7/28* (2013.01)

(58) Field of Classification Search
USPC ........................................ 219/121.81, 121.85
See application file for complete search history.

(56) References Cited

U.S. PATENT DOCUMENTS

| | | | | |
|---|---|---|---|---|
| 2008/0100829 | A1 | 5/2008 | Watson | |
| 2010/0294749 | A1* | 11/2010 | Kempe | G02B 21/245 |
| | | | | 219/121.75 |
| 2014/0042133 | A1 | 2/2014 | Weick | |
| 2016/0114434 | A1 | 4/2016 | Regaard | |
| 2018/0350622 | A1* | 12/2018 | Ikenoue | B23K 26/0738 |
| 2019/0160599 | A1* | 5/2019 | Izumi | B23K 26/0643 |
| 2020/0156184 | A1 | 5/2020 | Regaard | |

FOREIGN PATENT DOCUMENTS

| | | |
|---|---|---|
| DE | 10 2011 007 176 A1 | 10/2012 |
| DE | 10 2013 210 078 A1 | 12/2014 |
| DE | 10 2013 227 031 A1 | 6/2015 |
| DE | 102017005418 A1 | 12/2018 |
| DE | 10 2017 213 511 A1 | 2/2019 |
| DE | 10 2017 215 973 A1 | 3/2019 |
| WO | 2015185152 A1 | 12/2015 |

* cited by examiner

SYSTEM AND METHOD FOR FOCAL POSITION CONTROL

CROSS REFERENCE TO RELATED APPLICATIONS

The present application is a U.S. National Phase Application pursuant to 35 U.S.C. § 371 of International Application No. PCT/DE2020/000134 filed Jun. 16, 2020, which claims priority to German Patent Application No. 10 2019 004 337.5 filed Jun. 21, 2019. The entire disclosure contents of these applications are herewith incorporated by reference into the present application.

TECHNICAL FIELD

The present disclosure provides a focal position control system for a light beam, and more particularly a focal position control system for a laser beam in laser material processing applications.

The present disclosure relates to a focal position sensor. The present disclosure also relates to a laser optics with a focal position sensor for monitoring the focal position of the laser optics in real time, that is to say, during the application of the laser beam, and to a laser optics with a focal position sensor for controlling and/or regulating the focal position of the laser optics.

The present disclosure further relates to a method for determining a focal position of a light beam, as well as a method for monitoring the focal position of a laser optics in real time, and a method for controlling and/or regulating the focal position of a laser optics.

BACKGROUND

A central task in laser materials processing is the adjustment of the axial focal position of the laser beam relative to the material or workpiece to be processed. For optimal process management, the focus of the laser beam is not necessarily located directly on the surface of the workpiece. Rather, the optimal positioning of the laser beam focus relative to the workpiece depends on a plurality of factors. The focus can, for example, be located within the workpiece, that is to say, below the workpiece surface, in particular when processing workpieces of high material thickness. The machining result is often sensitively dependent on the exact focal position of the laser beam, which is why it is desirable or necessary that the positioning of the laser beam focus relative to the workpiece does not change during machining.

Modern laser processing systems use lasers with a high brilliance and a high power, often of the order of several kilowatts. Due to the material properties in the optical elements of laser processing optics, the high laser power leads to heating of the optical elements. This creates a radial temperature gradient in the optical elements, which results in an alteration in the refractive power of the optical elements, due to the temperature dependence of material parameters such as the refractive index. This effect is called thermal focus shift. Although this thermal focus shift can be minimised by suitable material selection for the optical elements, for example by using high-purity, low-absorption grades of quartz glass, it is nevertheless always present in practice. The effect is amplified by the gaseous reaction products generated during laser material processing, which can deposit on the laser optics or on the protective glass of the laser optics and lead to an increased absorption. Thus the protective glasses, in particular, often contribute to an undesired, change in the focal position of the laser optics over time.

To solve this problem, various devices have already been described in the prior art, which aim to determine the actual focal position of an optical system, and thus also enable the focal position to be tracked.

DE 10 2011 054 941 B3, for example, shows a device for correcting the thermal displacement of the focal position of a laser beam managed by way of optical elements. In this case, a back reflection from one of the surfaces of one of the last optical elements in front of the material to be processed is used, and a sensor is arranged at the location of the focus of the back reflection. According to the concepts propounded by the disclosure, the sensor itself can be any focus sensor that determines the location of the focus with sufficient accuracy. As an example, the publication refers to a focus sensor as disclosed in DE 198 23 951 A1. The latter publication propounds a focus sensor, in which an input beam is split into a reference beam and a sample beam, whereby the reference beam is modulated with a high-frequency dither signal, the sample beam and reference beam are recombined to generate an interference pattern, and the interference pattern is reproduced with a detection device. A circuit generates a focus change correction signal from the signals of the detection device.

The cited focus sensor is thus a highly complex optical device with moving components and relies on the split beams having sufficient coherence.

A further difficulty arises from the fact that when using a back reflection from a surface of an optical element of the laser optics, in particular from a surface of a protective glass, as is of known art from DE 10 2011 054 941 B3, it is usually not possible to ensure that only the desired back reflection from one of the surfaces can be used in isolation for evaluation. In fact, a back reflection is generated by each of the surfaces of the optical elements of the laser optics, so that, in total, a plurality of axially superimposed back reflections are present. If the focus sensor is now set up on one of the multiple back reflections in order to detect its change in focal position, the other multiple back reflections occur as parasitic signals (in other words, as disturbing signals), which can reduce the accuracy of, or even prevent, the reliable detection of the focal position.

An arrangement comparable to DE 10 2011 054 941 B3 is disclosed in DE 10 2007 053 632 A1. Here, the use of a partial beam coaxially back-reflected from an optical surface is propounded, which beam is separated from the main beam by way of a beam splitter, and is thus available for beam analysis. As a sensor for a beam analysis, a Hartmann-Shack sensor is specified, among other alternatives. A Hartmann-Shack sensor is used to determine the shape and curvature of the wavefront of a beam. The information about the wavefront curvature can also be used to calculate the focal position.

However, the use of a Hartmann-Shack sensor as a focus sensor also presents some difficulties. A Hartmann-Shack sensor of known prior art, also called a wavefront sensor, essentially consists of a lens array and a spatially-resolving detector arranged at a distance equal to the focal length of the individual lenses of the lens array. On the detector of the wavefront sensor, therefore, illumination with a light beam results in a plurality of individual focal points in a regular arrangement corresponding to the geometry of the lens array. The lateral position of the individual focal points depends on the local inclination of the wavefront of the light beam at the respectively associated sub-apertures formed by the individual lenses of the lens array. Thus, from the totality of the positions of the focal points, the geometry of the wavefront exhibited by the light beam in front of the lens array can be reconstructed. In particular, this also allows the global curvature of the wavefront to be determined, and thus to be extrapolated back to the focal position of the light beam.

In this case, one of the possible difficulties that occurs is a uniqueness problem. If the wavefront is strongly distorted, that is to say, has large local inclinations, the lateral position of the focal point belonging to the corresponding partial aperture can then be displaced so far laterally that the focal point already slips into the cell of the neighboring focal point. The wavefront sensor can then no longer assess which focus point belongs to which partial aperture. In the case of a wavefront sensor, it must therefore be required that the beam to be measured has only small deviations from a plane wavefront, and/or that the angles of the centroid axes of the partial beams to the optical axis are smaller than half the aperture angle of the partial beams focussed by the individual lenses of the lens array. To achieve this, the focal lengths of the individual lenses of the lens array are typically small, for example compared to the diameter of the light beam, and accordingly the distance between the lens array and the detector is small. At the same time, however, this means that the sensitivity of the lateral position of the focal points on the detector to changes in the axial (object or intermediate) focal position of the light beam is relatively low.

A further difficulty of the wavefront sensors of known art is that an evaluation of the focal point positions of the partial apertures is no longer possible in a meaningful way if the light beam to be measured actually consists of a superposition of a plurality of light beams, or multiple laser beam back reflections, with focal positions deviating from one another. However, this is precisely the typical situation already demonstrated, which occurs when measurement beams or sample beams are generated by back reflection from surfaces of the elements of laser optics. The wavefront sensors of known art would not provide reliable results, due to the multiplicity of focal points on the detector then occurring, which cannot be assigned.

The device disclosed in DE 10 2015 001 421 B4 circumvents this problem by introducing an additional element into the focussed beam of the laser optics for generating a back reflection used for beam analysis, wherein the curvature of the partially-reflecting surface of the additional element is adapted to the mean curvature of the wave front of the focussed beam. Thus, on the one hand, the beam is exactly reflected back into itself, so that the focal positions of other, undesired back reflections are axially far enough away such that these no longer interfere, and on the other hand, the partial reflection factor of the additionally introduced element can be selected to be higher, in order to reduce the interference distance to the other reflections. However, since an additional element is introduced into the beam path for this purpose, this method is not suitable for determining and correcting the focal position in real time during laser processing.

DE 10 2013 227 031 A1 shows another device for correcting a focal length shift, in which a portion of the light beam reflected by the protective glass is deflected into a measurement beam path onto a sensor for beam analysis. The component reflected from the protective glass is passed through an aperture in the measurement beam path, whereby parasitic beams (in other words, disturbing beams) reflected from other parts of the device are blocked. To achieve the desired blocking of parasitic beams, an inclined position of the protective glass and/or the use of wedge plates to deflect the reflected beam is envisaged. As a sensor, the disclosure propounds the use of a CCD camera or a CMOS camera. This is intended to achieve a measurement in accordance with DIN ISO 11146, and the determination of the focal length actually present is to be carried out by means of an ABCD matrix calculation.

DE 10 2011 007 176 A1 also propounds the use of a back reflection from the protective glass, and the detection of the back reflected radiation with a detector to determine the focal position. In this case, the protective glass is arranged at such a large tilt angle that the back-reflected radiation is deflected directly to the side, and no further beam splitting is required. An aperture is provided for blocking the radiation reflected back from one of the sides of the protective glass. The focal position of the laser beam is determined by evaluating the size, that is to say, the diameter, of the laser radiation on the detector.

The use of slanted protective glasses is generally disadvantageous, as this can create astigmatism in the focussed laser beam. In addition, the working distance is reduced, and the designs usually provided for replacing the protective glass, such as drawers or screw mounts, become more complex. The use of wedge plates for beam splitting or beam deflection also requires more elaborate designs.

The focus sensors used in the prior art are therefore very complex, for example in the case of devices operating on an interferometric basis, or beam measurements are carried out in accordance with DIN ISO 11146, which is very complex for determining a focal position if a high level of accuracy is to be achieved, because the beam caustic must be recorded in many planes for this purpose, or wavefront sensors are used, which is only possible within a limited sensitivity range, and leads to problems during evaluation in the case of multiple back reflections. Multiple back reflections obviously lead to functional limitations and/or to reduced accuracy in all known focus sensors, which is why attempts are usually made to limit or eliminate these reflections with more or less effective and complex measures. Further problems can arise with systems of known prior art if the beam quality of the laser beam used for a laser processing operation is not constant, but varies over time. Changes in the beam diameter of the back reflection detected by the focus sensor can then occur, which can be incorrectly interpreted as an alteration in the focal position.

There thus exists a need for a simple, robust and highly sensitive focal position sensor, which is able to evaluate measurement beams, even in the presence of parasitic multiple back reflections, and which is insensitive to changes in the beam quality of the underlying beam. A need also exists for improved systems for focal position control, and for the tracking of the laser beam focus in laser optics.

SUMMARY

It is an object of the present disclosure to provide a system for focal position control with an improved focal position sensor.

To achieve the object, a beam analysis device for determining a state of a beam of light is proposed, which includes a partial beam imaging device that is configured to receive a first measurement beam (a first beam to be measured), and which includes at least a first selection device for forming a first partial beam from a first partial aperture region of the first measurement beam, and which further includes an imaging device with at least one imaging optical element. The beam analysis device further includes a detector unit with at least one, at least one-dimensionally spatially-re-solving, light-sensitive detector arranged at a distance from the partial beam imaging device, and an evaluation unit for processing signals from the detector unit. The first selection device is arranged off-centre with respect to an optical axis for irradiating the first measurement beam. The partial beam imaging device is configured to image the first partial beam onto the detector unit so as to generate a first beam spot. The detector unit is configured to capture an intensity distribution of the first beam spot. The evaluation unit is configured to determine a lateral position of the first beam spot. The evaluation unit is furthermore configured to determine changes of the lateral position of the first beam spot over time.

A device is provided, in which a change in an axial focal position or intermediate focal position of the measurement beam is correlated with a change in the lateral position of the first beam spot on the detector unit.

A device is also provided, in which a radial distance of the centre of the first partial aperture region, defined by the first selection device, from the optical axis, is at least as large as a width of the first partial aperture region in the radial direction.

A device is furthermore provided, in which the evaluation unit is configured to determine the lateral position of the first beam spot by means of calculating the centroid of the intensity distribution of the beam spot, and/or by means of determining an edge or a peripheral contour of the beam spot, and/or by means of determining a geometric centre of the beam spot, and/or by means of adaptation a setpoint intensity distribution to the captured intensity distribution of the beam spot.

In another possible device, the partial beam imaging device is configured to receive the first measurement beam and at least one second measurement beam, wherein the measurement beams are superimposed on the same optical axis.

A device is provided, in which the evaluation unit is configured to identify at least two beam spots in an intensity distribution captured by the detector unit, and to determine the lateral positions of the at least two identified beam spots.

A device is also provided, in which the partial beam imaging device further includes at least a second selection device for forming a second partial beam from a second partial aperture region of the first measurement beam, and in which the partial beam imaging device is configured to image the second partial beam onto the detector unit so as to generate a second beam spot.

Furthermore, a device is provided, in which a radial distance of the centre of the second partial aperture region, defined by the second selection device, from the optical axis, is at least as large as a width of the second partial aperture region in the radial direction.

In another possible device, provision is made for the first partial aperture region selected by the first selection device and the second partial aperture region selected by the second selection device to be non-contiguous, and a separation distance from the centre of the first partial aperture region to the centre of the second partial aperture region is at least as great as the sum of the widths of the first and second partial aperture regions.

Furthermore, a device is also provided, in which a partially-reflecting beam splitter is arranged in front of the partial beam imaging device for generating the measurement beam by coupling out a defined beam component from a light beam or laser beam directed onto the beam splitter.

An optical system is also provided, which includes a laser optics for a laser beam and a beam analysis device as previously described. The laser optics includes a partially-reflecting beam splitter for coupling out the measurement beam from the laser beam towards the beam analysis device. The beam analysis device is configured to receive the measurement beam coupled out by way of the beam splitter.

An optical system is furthermore provided, which includes laser optics for a laser beam and a beam analysis device as described above, wherein the laser optics includes at least: an interface (in other words, a boundary surface) of an optical element of the laser optics for generating a partially-reflected beam from the laser beam, and a partially-reflecting beam splitter for coupling out the measurement beam from the partially-reflected beam towards the beam analysis device. The beam analysis device is configured to receive the measurement beam coupled out by way of the beam splitter.

An optical system is provided, which includes a laser o optics for a laser beam and a beam analysis device as previously described, wherein the laser optics includes at least the following elements: an interface of an optical element of the laser optics for generating a partially-reflected beam from the laser beam, at least one further interface of an optical element of the laser optics for generating at least one further partially-reflected beam from the laser beam, and a partially-reflecting beam splitter for coupling out the first measurement beam from the partially-reflected beam, and for coupling out at least one second measurement beam from the at least one further partially-reflected beam towards the beam analysis device. The beam analysis device is configured to receive the measurement beam coupled out by way of the beam splitter.

An optical system is also provided, in which the interface for generating the partially-reflected beam is the interface last transited by the laser beam before the laser beam exits the laser optics.

An optical system is provided, in which the laser optics is configured to generate a laser beam focus, and in which a change in an axial position of the laser beam focus is correlated with a change in the lateral position of the first beam spot.

An optical system is also provided, in which the laser optics is connected to a guiding machine, which is configured to adjust an axial position of a laser beam focus of the laser optics, and in which a controller of the guiding machine is coupled to the evaluation unit to receive data determined from the position of the at least one beam spot on the detector unit.

Finally, an optical system is provided, in which the laser optics includes an axially movable lens, or lens group, the position of which is adjustable by means of a translation device, and wherein the translation device is configured to control the position of the lens, or lens group, as a function of a value provided by the evaluation unit, which value is determined from the position of the at least one beam spot on the detector unit.

To achieve the object, a beam analysis method for determining a state of a beam of light is also proposed, which includes the following steps: A first partial beam is formed from a first measurement beam by selecting a first partial aperture region from the measurement beam, wherein the first partial aperture region is arranged off-centre with respect to an optical axis of the measurement beam. The first partial beam is imaged onto a detector unit for generating a first beam spot on the detector unit, wherein the detector unit includes at least one, at least one-dimensionally spatially-resolving, light-sensitive detector. An intensity distribution is captured by means of the detector unit, wherein the intensity distribution includes beam intensity values of the first beam spot. A lateral position of the first beam spot is determined from the captured intensity distribution. Changes in the lateral position of the first beam spot over time are determined. The lateral position of the first beam spot, or an altered value of the lateral position, or a value determined from the lateral position, or from the change of the lateral position, is provided.

A method is provided, in which a change in an axial focal position or intermediate focal position of the first measurement beam is correlated with a change in the lateral position of the first beam spot on the detector unit.

A method is also provided, in which a radial distance of the centre of the first partial aperture region from the optical axis is at least as large as a width of the first partial aperture region in the radial direction.

Furthermore, a method is provided, wherein the determination of the lateral position of the first beam spot includes at least one of the following steps: Calculation of the centroid of the intensity distribution of the beam spot, determination of an edge or a peripheral contour of the beam spot, determination of a geometric centre of the beam spot, Adaptation of a setpoint intensity distribution to the detected intensity distribution of the beam spot.

A method is also provided with the following further method steps: formation of a further first partial beam from a second measurement beam by selection of the first partial aperture region from the second measurement beam, wherein the first measurement beam and the second measurement beam are superimposed on the same optical axis, and imaging of the further first partial beam of the second measurement beam onto the detector unit so as to generate a further first beam spot on the detector unit.

A method is provided with the following further method steps: identification of at least two beam spots in the intensity distribution captured by the detector unit, and determination of lateral positions of the at least two identified beam spots.

A method is further provided with the following further method steps: formation of a second partial beam from the first measurement beam by selection of a second partial aperture region from the measurement beam, imaging of the second partial beam onto the detector unit so as to generate a second beam spot on the detector unit.

A method is also provided, in which a radial distance of the centre of the second partial aperture region from the optical axis is at least as large as a width of the second partial aperture region in the radial direction.

In another method that is provided, the first partial aperture region and the second partial aperture region are not contiguous. In this case, a separation distance from the centre of the first partial aperture region to the centre of the second partial aperture region is at least as great as the sum of the widths of the first and second partial aperture regions.

A method is also provided, in which the first measurement beam is generated by means of coupling out a defined beam component from a light beam or laser beam.

Furthermore, a method is provided, in which the first measurement beam is formed by coupling out a defined beam component from a laser beam, guided in a laser optics, by means of a partially-reflecting beam splitter arranged in the laser optics.

A method is provided with the following additional method steps: generation of a partially-reflected beam from a laser beam, guided in a laser optics, by partial reflection at an interface of an optical element of the laser optics, propagation of the partially-reflected beam counter to the beam direction of the laser beam, and generation of the first measurement beam by coupling out a defined beam component from the partially-reflected beam by means of a partially-reflecting beam splitter, which is arranged in the laser optics.

A method is also provided with the following additional method steps: generation of at least one further partially-reflected beam from the laser beam guided in the laser optics by partial reflection at at least one further interface of an optical element of the laser optics, propagation of the further partially-reflected beam counter to the beam direction of the laser beam, and generation of a second measurement beam by coupling out a defined beam component from the further partially-reflected beam by means of the partially-reflecting beam splitter.

A method is provided, in which the interface for generating the partially-reflected beam is the interface last transited by the laser beam before the laser beam exits the laser optics.

A method is also provided, in which a laser beam focus is generated by means of the laser optics, and in which a change in an axial position of the laser beam focus is correlated with a change in a lateral position of the first beam spot.

Furthermore, a method is provided, in which an axial position of a laser beam focus of the laser optics relative to a workpiece is adjusted by means of a guiding machine connected to the laser optics, and wherein data determined from the position of the at least one beam spot on the detector unit is forwarded to a controller of the guiding machine.

A method is also provided, in which an axial position of a laser beam focus is adjusted by means of an axially movable lens, or lens group, arranged in the laser optics, the position of which is adjusted by means of a translation device, and wherein data determined from the position of the at least one beam spot on the detector unit are forwarded to the translation device for controlling and/or regulating the position of the lens, or the lens group.

Finally, a method is also provided, in which the position of the laser beam focus relative to a workpiece is maintained in a defined position during laser material processing.

BRIEF DESCRIPTION OF THE FIGURES

The present disclosure is illustrated in more detail with reference to the following figures, without being limited to the illustrative embodiments and examples shown. Rather, embodiments are also envisaged, in which features illustrated in various figures can be combined. Here.

DETAILED DESCRIPTION

Figure 1:
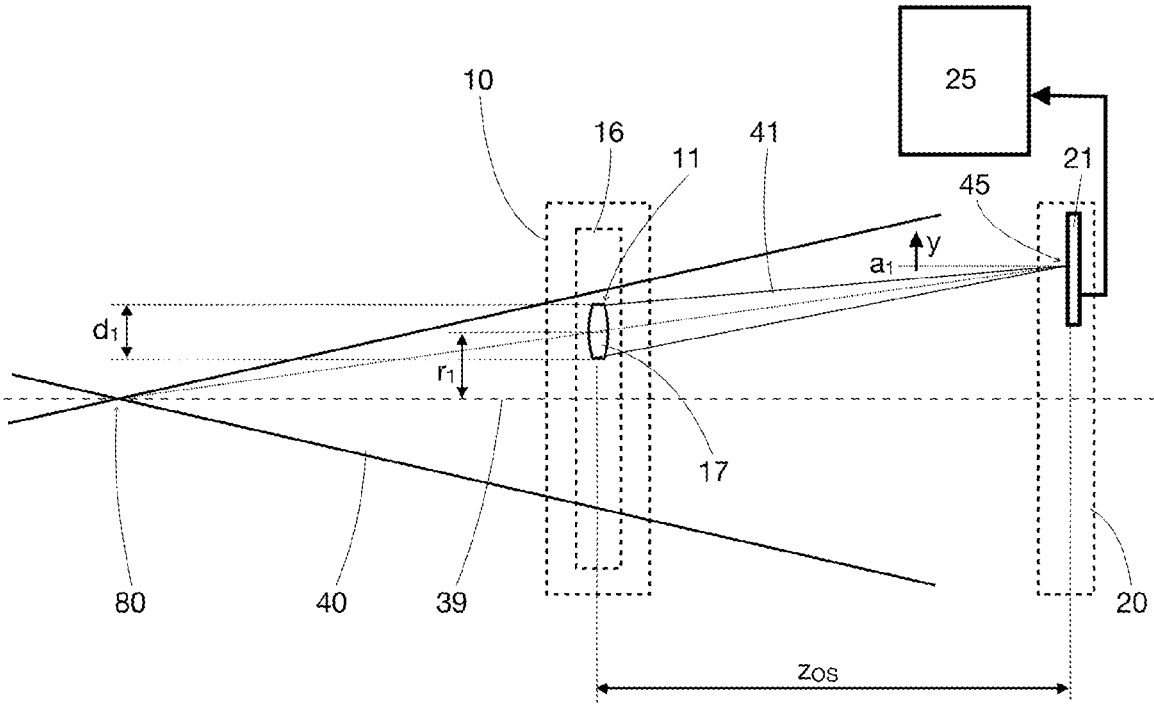
FIG. 1 shows a schematic illustration of a first, basic form of embodiment of the focal position sensor.

FIG. 1 schematically illustrates a first, basic form of embodiment of the present disclosure. The figure shows a focal position sensor. The focal position sensor includes a partial beam imaging device 10 with a first selection device 11 and with an imaging device 16, a detector unit 20 with an, at least one-dimensionally spatially-resolving, light-sensitive first detector 21, such as a line detector, or a camera chip, and an evaluation unit 25, which is connected to the detector unit 20. The evaluation unit 25 registers the signals from the detector unit 20 and evaluates them. The detector unit 20 is arranged behind the partial beam imaging device 10 at a distance zos from the partial beam imaging device 10. It is provided to radiate a measurement beam 40 along the optical axis 39 towards the partial beam imaging device 10. The measurement beam 40 can, for example, have an intermediate focus 80 on the optical axis 39; however, the measurement beam 40 can also be collimated, or divergent, or convergent. By means of the first selection device 11 of the partial beam imaging device 10, a first partial beam 41 is excised from the measurement beam 40. By means of an imaging optical element 17 which is part of the imaging device 16, for example an optical lens, the first partial beam 41 is imaged onto the detector unit 20, where it forms a first beam spot 45. The first selection device 11 is arranged off-centre with respect to the optical axis 39. The centre of the first selection device 11 has a lateral or radial distance $r_1$ from the optical axis 39. The selection device 11 and thus the first partial aperture region has a width $d_1$ in the radial direction. In this example of embodiment, the first selection device 11 is formed as a rim of the imaging optical element 17. Outside the first selection device 11, in this example of embodiment, radiation of the measurement beam 40 can pass by the selection device 11 and reach the detector unit 20. A signal background thereby generated is so small that it is negligible, and does not interfere with the evaluation of the detector signals. The evaluation unit 25 is configured to determine a lateral position $a_1$ of the first beam spot 45 from the intensity distribution captured by the detector 21 of the detector unit 20. The lateral position $a_1$ of the first beam spot 45 depends, inter alia, on the axial position of the intermediate focus 80 of the measurement beam 40. The lateral position $a_1$ is thus a relative measure of the focal position of the measurement beam 40.

Figure 2:
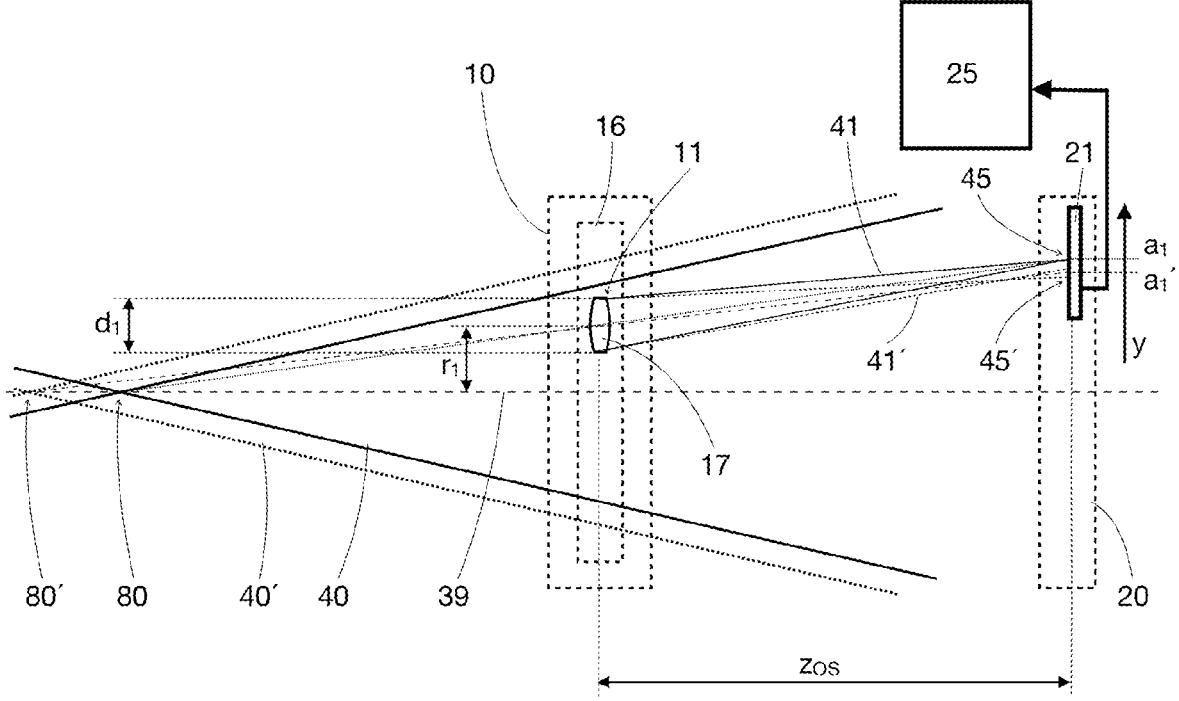
FIG. 2 shows a schematic illustration of the first, basic form of embodiment of the focal position sensor as in FIG. 1 with an additional illustration of a change in the measurement beam focal position.

FIG. 2 shows the same form of embodiment of a focal position sensor according to the present disclosure as FIG. 1. FIG. 2 additionally shows altered beams which have arisen, for example, as a result of an axial displacement of the focus, or the intermediate focus, of the measurement beam 40. The elements of the reference symbols marked with a dash refer to the altered beams and quantities. In this way, the relationship between the axial position of the intermediate focus 80 of the measurement beam 40 and the lateral position $a_1$ of the first beam spot 45 is illustrated. For this purpose, in addition to the original measurement beam 40, an exemplary displaced measurement beam 40' is drawn in FIG. 2a, the intermediate focal position 80' of which is located further away from the partial beam imaging device 10 by a small amount. As a result, the chief ray of the displaced first partial beam 41' has an altered angle to the optical axis 39. Consequently, the lateral position $a_1'$ of the first beam spot 45' on the detector unit 20 also changes. In the example shown with the intermediate focus 80' further away, the lateral position of the beam spot is displaced closer to the optical axis 39. The device is thus able to accurately track changes, for example changes over time, in the focal position of the measurement beam 40.

Figure 3:
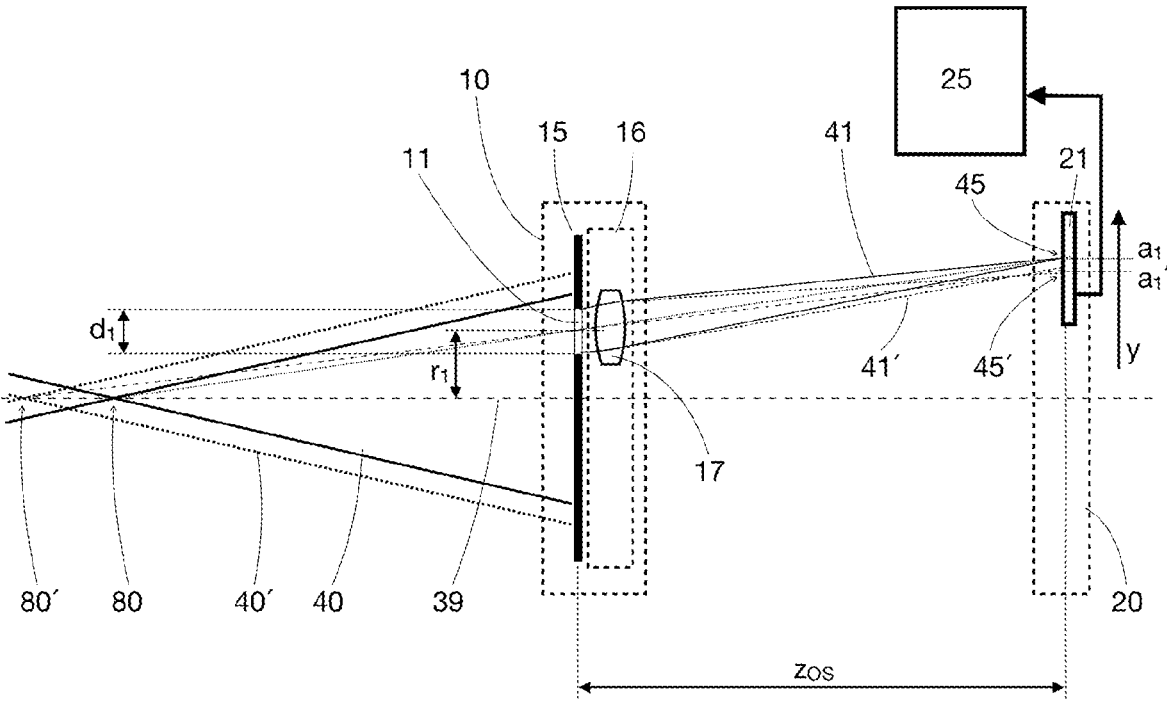
FIG. 3 shows a schematic illustration of a second, basic form of embodiment of the focal position sensor.

FIG. 3 schematically illustrates a second, basic form of embodiment of the present disclosure. The focal position sensor differs from the form of embodiment shown in FIGS. 1 and 2 in the partial beam imaging device 10, which here comprises an additional aperture device 15. The aperture device 15 comprises a first aperture. As a result, the first selection device 11 is formed here by the first opening of the aperture device 15. The remaining elements do not differ from the first form of embodiment, so that reference is made to the description of FIGS. 1 and 2 in this respect. By separating the function of the imaging device 16 and the selection device 11 into two separate elements, greater freedom can be used in the design configuration. Moreover, in this form of embodiment, the radiation of the measurement beam 40 outside the first selection device 11 is blocked by the aperture device 15 and thus does not reach the detector unit 20, thereby reducing any background of parasitic radiation.

Figure 4:
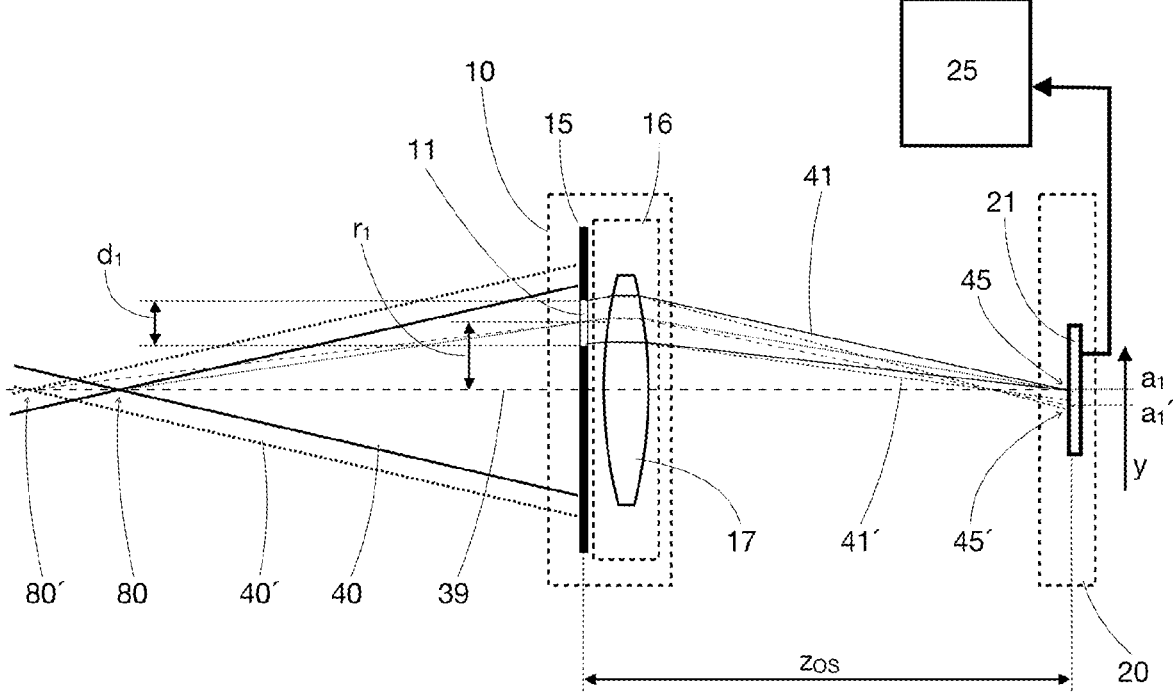
FIG. 4 shows a schematic illustration of a third, basic form of embodiment of the focal position sensor.

FIG. 4 shows a further form of embodiment of the focal position sensor which is largely identical to the second form of embodiment of FIG. 3. The imaging optical element 17 of the imaging device 16, for example an optical lens, is here made larger, and is arranged centred on the optical axis 39. As a result, the beam spot 45 is also imaged on the optical axis 39, so that the detector unit 20 or the first detector 21 can also be arranged centred on the optical axis 30.

Figure 5:
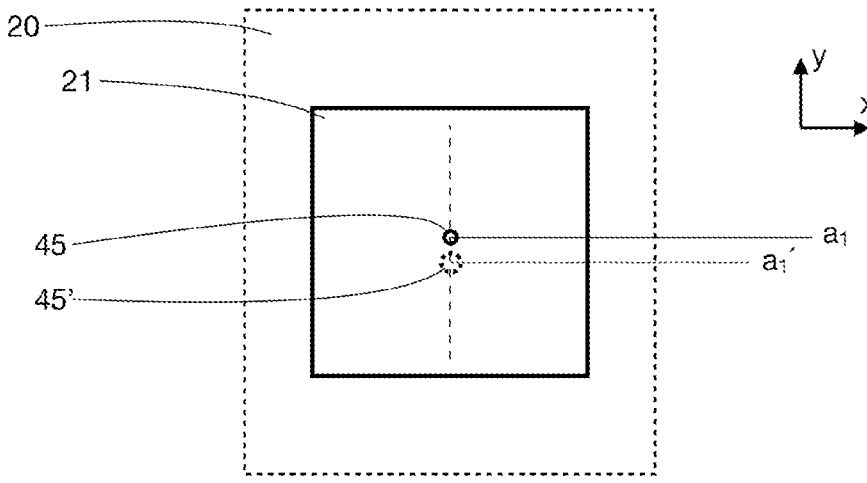
FIG. 5 shows a schematic illustration of the beam spot position and a change in the beam spot position on the detector unit, for forms of embodiment of the focal position sensor according to FIGS. 1 to 4.

FIG. 5 shows a plan view of the detector unit 20 of the focal position sensor, for example according to FIGS. 1 to 4, illustrating the beam spot 45 as well as the displaced beam spot 45' on the first detector 21 of the detector unit 20 and the corresponding change of the lateral position $a_1$ of the first beam spot 45 to the altered lateral position $a_1'$ of the displaced first beam spot 45'.

Figure 6:
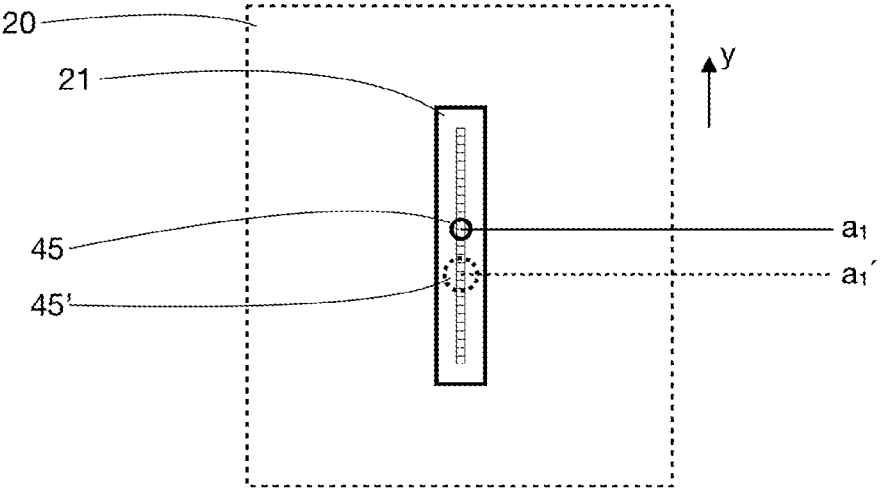
FIG. 6 shows a schematic illustration of a detector unit with a line detector.

FIG. 6 shows a possible form of embodiment of the detector unit 20 with a one-dimensionally spatially-resolving, line sensor as the first detector 21. The orientation of the line sensor is aligned with the radial direction defined by the radial distance of the centre of the selection device 11 to the optical axis 39.

Figure 7:
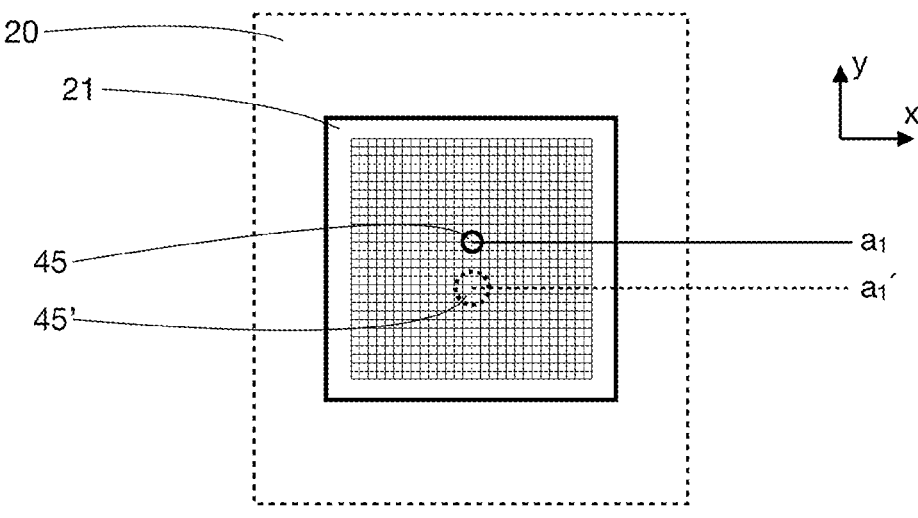
FIG. 7 shows a schematic illustration of a detector unit with a two-dimensionally spatially-resolving detector.

FIG. 7 shows another possible form of embodiment of the detector unit 20 with a two-dimensionally spatially-resolving, sensor as the first detector 21. This can be, for example, a CCD camera, or a CMOS camera, or another light-sensitive, pixel-based sensor.

Figure 8:
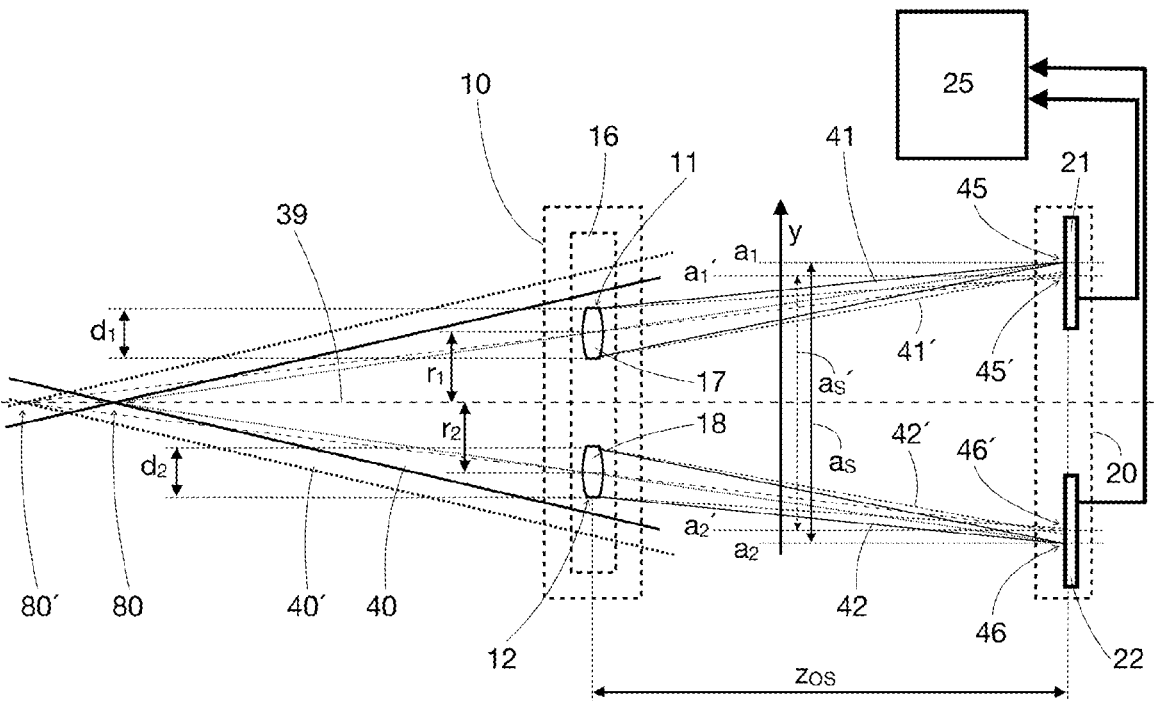
FIG. 8 shows a schematic illustration of a fourth form of embodiment of the focal position sensor with two selection devices, and with two detectors in the detector unit.

FIG. 8 shows a focal position sensor according to the present disclosure in a fourth form of embodiment. The focal position sensor comprises a partial beam imaging device 10, a detector unit 20 and an evaluation unit 25. The partial beam imaging device 10 comprises here a first selection device 11, a second selection device 12, and an imaging device 16 with an imaging optical element 17, and a further imaging optical element 18. The detector unit 20 comprises here a first detector 21 and a second detector 22. The detectors 21, 22 are, at least one-dimensionally spatially-resolving, light-sensitive detectors, such as line detectors or camera chips. The evaluation unit 25 is connected to the detector unit 20. Here, the evaluation unit 25 registers the signals from the first detector 21 and the second detector 22, and evaluates them. The detector unit 20 is arranged behind the partial beam imaging device 10 at a distance zos from the partial beam imaging device 10. A measurement beam 40 is provided, to be radiated along the optical axis 39 in the direction of the partial beam imaging device 10. The measurement beam 40 can, for example, have an intermediate focus 80 on the optical axis 39. The first selection device 11 is here formed by the rim of the imaging optical element 17, and the second selection device 12 is formed by the rim of the imaging optical element 18. By means of the first selection device 11 a first partial aperture region is selected from the measurement beam 40, and by means of the second selection device 12 a second partial aperture region is selected from the measurement beam 40. The two partial aperture regions are not contiguous, but rather are radially spaced apart from each other. The centres of the selection devices 11, 12 each have a lateral or radial distance $r_1$, $r_2$ from the optical axis 39. The selection devices 11, 12 and thus also the selected partial aperture regions each have a width $d_1$, $d_2$ in the radial direction. A first partial beam 41 is generated from the measurement beam 40 by selecting the first partial aperture region by means of the first selection device 11, and a second partial beam 42 is generated by selecting the second partial aperture region by means of the second selection device 12. The two partial beams 41, 42 are imaged onto the detector unit 20 by means of the imaging device 16. For this purpose, the imaging device 16 comprises, in this example of embodiment, an imaging optical element 17 and a further imaging optical element 18, which are both configured here as converging lenses and, as partial aperture lenses, in each case focus the radiation of one of the selected partial aperture regions. By the imaging by means of the lens 17, the first partial beam 41 is imaged onto the first detector 21 and there forms a first beam spot 45; analogously, by the imaging by means of the lens 18, the second partial beam 42 is imaged onto the second detector 22 and there forms a second beam spot 46. The use of two detectors 21, 22 is not necessary; only a first detector 21 can also be used if the detector 21 is sufficiently large, or if the beam spots 45, 46 on the detector have a sufficiently small separation distance as from one another. The evaluation unit 25 is configured to determine the lateral position $a_1$ of the first beam spot 45 and the lateral position $a_2$ of the second beam spot 46 from the intensity distributions registered by the detectors 21, 22 of the detector unit 20. The evaluation unit can furthermore be configured to determine the separation distance as between the lateral position $a_1$ of the first beam spot 45 and the lateral position $a_2$ of the second beam spot 46. In FIG. 8, altered beams are additionally shown, which have resulted, for example, from an axial displacement of the measurement beam 40. Here, the elements of the reference symbols provided with a dash refer to the corresponding altered beams and quantities. In this example, the displaced measurement beam 40' has an intermediate focus 80' which is located further away from the partial beam imaging device 10 by a small amount. As a result, the partial beams 41', 42' generated by the selection devices 11, 12 from the displaced measurement beam 40' have an altered, smaller angle to the optical axis 39, so that the lateral positions $a_1'$, $a_2'$ of the beam spots 45', 46' on the detector unit 20 are displaced closer to the optical axis 39 and thus the separation distance as' between the lateral position $a_1'$ of the displaced first beam spot 45' and the lateral position $a_2'$ of the displaced second beam spot 46' is reduced compared to the separation distance as. By determining the separation distance $a_S$, $a_S'$ between the beam spots instead of, or in addition to, determining the individual lateral positions of the beam spots, the sensitivity of the focal position sensor for determining focal position changes of the measurement beam 40 is increased, since the beam spot positions shift in opposite directions and thus the change in the separation distance is twice as large as the change in the individual positions.

Figure 9:
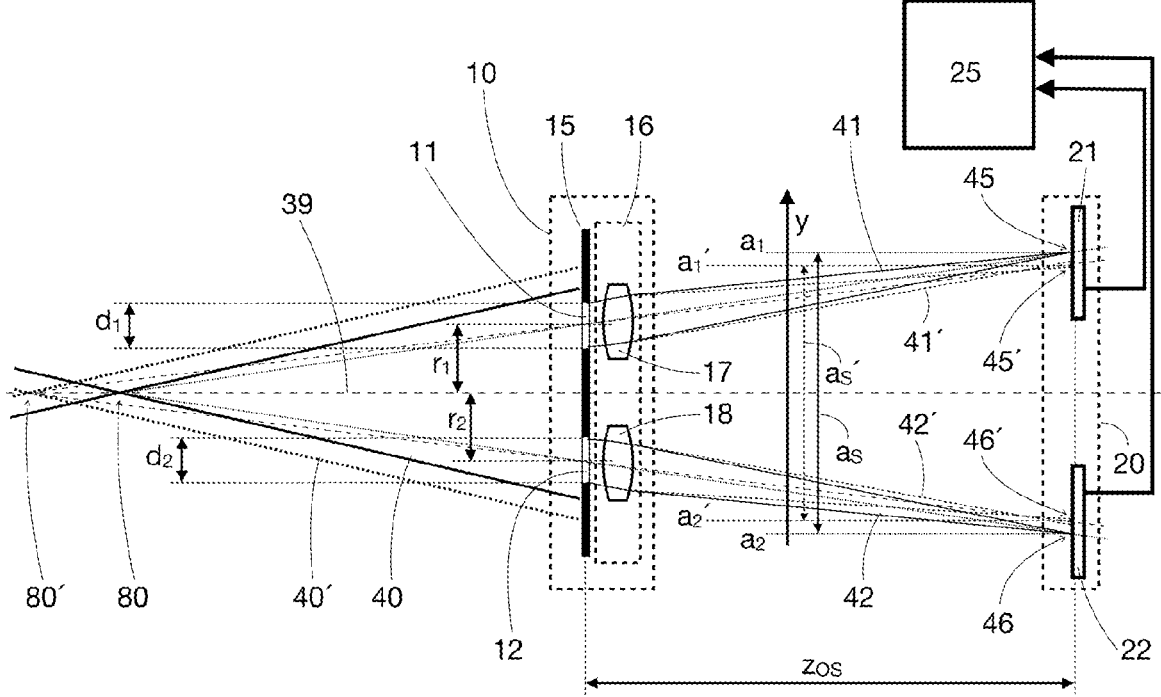
FIG. 9 shows a schematic illustration of a fifth form of embodiment of the focal position sensor with two selection devices, and with two detectors.

FIG. 9 shows a schematic illustration of a fifth form of embodiment of the present disclosure. The focal position sensor shown differs from the fourth form of embodiment shown in FIG. 8 in the partial beam imaging device 10, which here comprises an additional aperture device 15. The aperture device 15 has a first opening and a second opening. The first selection device 11 is formed by the first opening of the aperture device 15, and the second selection device 12 is formed by the second opening of the aperture device 15. The remaining elements do not differ from the fourth form of embodiment, so reference is made to the description of FIG. 8 in this respect. The separation of the function of the imaging device 16 and the selection devices 11, 12 into separate elements can be advantageous for the design configuration, and for the reduction of a possible background of parasitic radiation.

Figure 10:
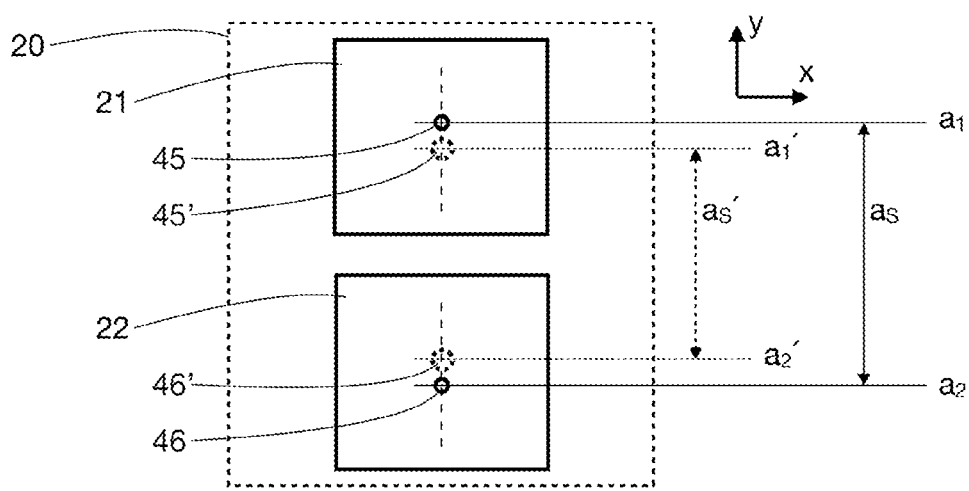
FIG. 10 shows a schematic illustration of the beam spot position and a change in the beam spot position on a detector unit with two detectors, for forms of embodiment of the focal position sensor as in FIGS. 8 and 9.

FIG. 10 shows a plan view of the detector unit 20 of the focal position sensor, for example according to FIGS. 8 and 9. This illustrates the beam spots 45 and 46 as well as the displaced beam spots 45' and 46' on the detectors 21, 22 of the detector unit 20, and the corresponding positions $a_1$ and $a_2$ and the altered positions $a_1'$ and $a_2'$, respectively, as well as the separation distances between the beam spots as, $a_S'$.

Figure 11:
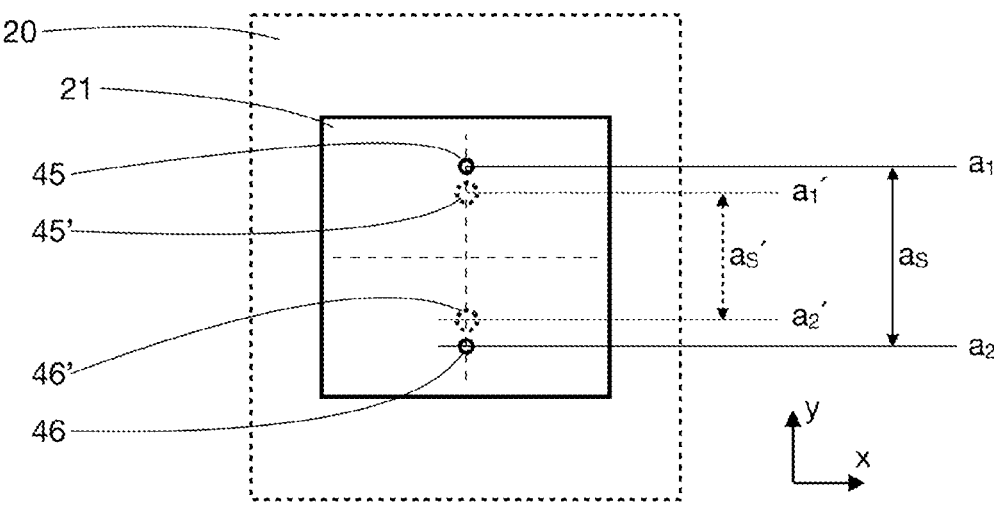
FIG. 11 shows a schematic illustration of the beam spot position and an alteration in the beam spot position for forms of embodiment of the focal position sensor with two selection devices, on a detector unit with only one detector, according to forms of embodiment of the focal position sensor that are illustrated in the following figures.

FIG. 11 shows a plan view of a detector unit 20 of the focal position sensor, which can also be used in the forms of embodiment of the focal position sensor with two selection devices 11, 12 according to FIGS. 8 and 9 if the detector is sufficiently large, or if the beam spots 45, 46 on the detector have a sufficiently small separation distance as from one another. The detector unit 20 then requires only one detector 21, onto which all beam spots 45, 46 are imaged. The position of the beam spots and of the altered beam spots relative to one another corresponds in other respects to the illustration in FIG. 10.

FIGS. 12 to 19 show further variants and possible forms of embodiment of a focal position sensor according to the present disclosure, and/or specific aspects of embodiments, which can be advantageous and can also be combined in further forms of embodiment (not shown). Therefore, only the particular features or modifications of the respective form of embodiment are discussed, and reference is otherwise made to the explanations of the previous forms of embodiment.

Figure 12:
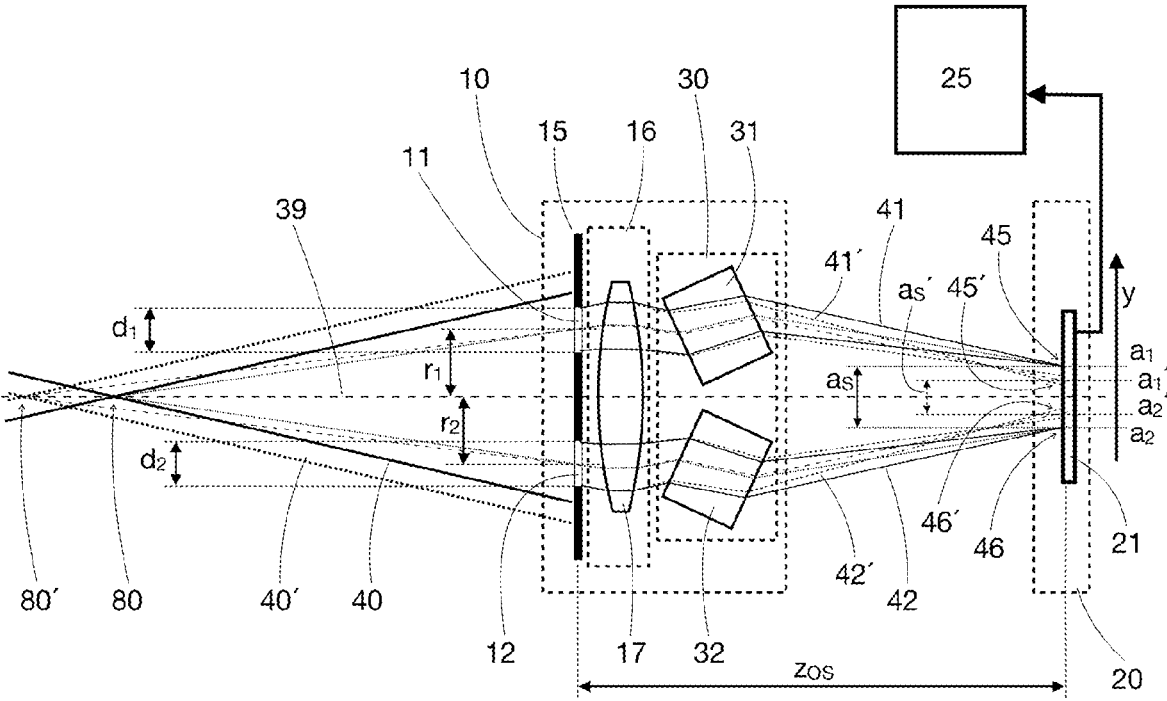
FIG. 12 shows a schematic illustration of a sixth form of embodiment of the focal position sensor with two selection devices, with a beam separator device, and with a detector.

Thus FIG. 12 shows a focal position sensor whose partial beam imaging device 10 comprises two selection devices 11 and 12 formed by an aperture device 15. The imaging device 16 here includes only a single imaging optical element 17, which is designed to be large enough to extend laterally and radially over both selected partial aperture regions, and thus both partial beams 41 and 42 are imaged onto the detector unit 20 by the same imaging optical element 17. Without additional measures, both partial beams 41, 42 would then be imaged onto the optical axis, so that the beam spots 45 and 46 would overlap. For this reason, the partial beam imaging device 10 here additionally comprises a beam separator device 30, by means of which the partial beams 41 and 42, and thus also beam spots 45 and 46, are displaced laterally so as to separate them spatially from one another. In the example shown, the beam separator device 30 comprises a plane plate arrangement with plane plates 31 and 32, which are inclined by a defined, or also adjustable, angle, and thus effect a lateral beam offset. In this manner, all the essential functional elements, in particular the selection devices, the imaging device, and the detector unit, as well as the relevant geometric variables, can be configured independently of one another.

Figure 13:
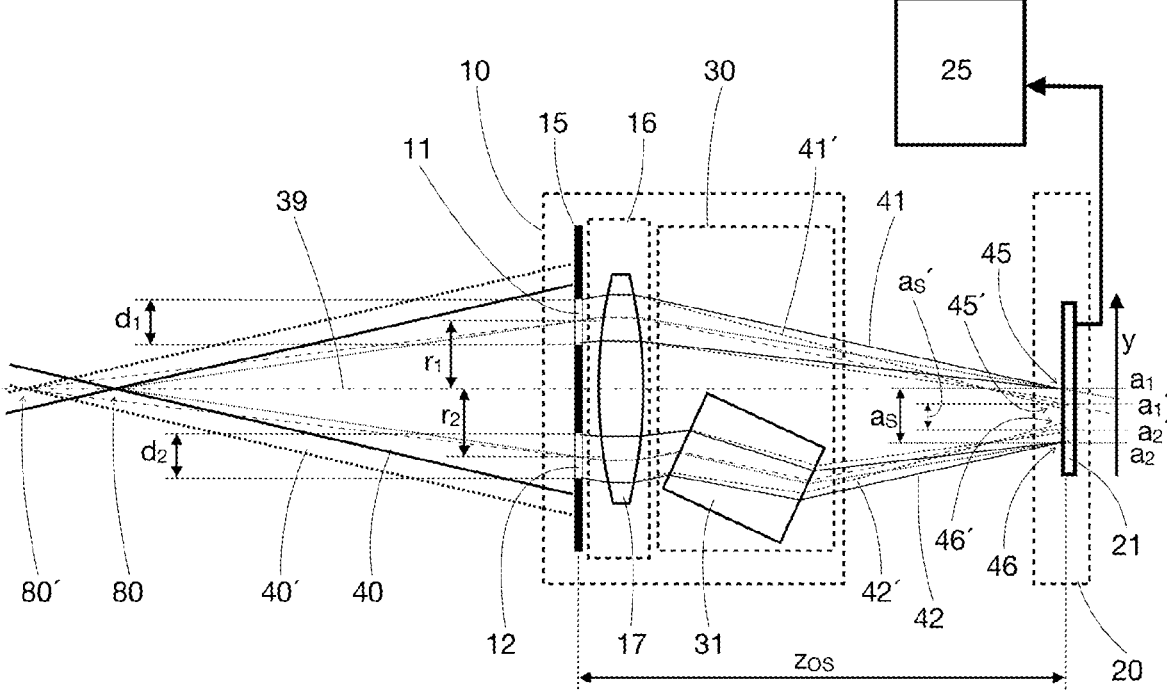
FIG. 13 shows a schematic illustration of a seventh form of embodiment of the focal position sensor.

The focal position sensor shown in FIG. 13 corresponds almost exactly to the form of embodiment shown in FIG. 12, wherein the beam separator device 30 here comprises only one plane plate 31, which acts only on one partial beam and displaces it laterally.

Figure 14:
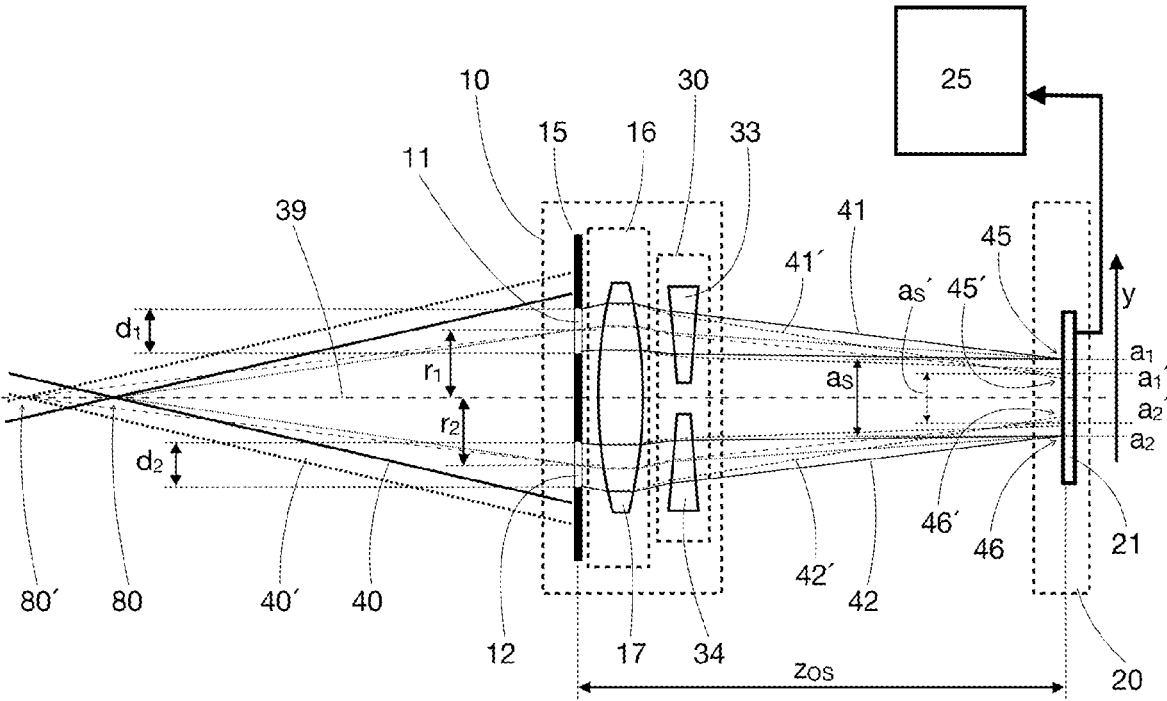
FIG. 14 shows a schematic illustration of an eighth form of embodiment of the focal position sensor.

The focal position sensor shown in FIG. 14 also largely corresponds to the form of embodiment shown in FIG. 12. Here, the beam separator device 30 comprises a wedge plate arrangement 33, 34. By this means each partial beam 41 and 42 is deflected by a respective wedge plate 33, 34 through a defined angle, so that the beam spots 45 and 46 are laterally offset on the detector unit.

Figure 15:
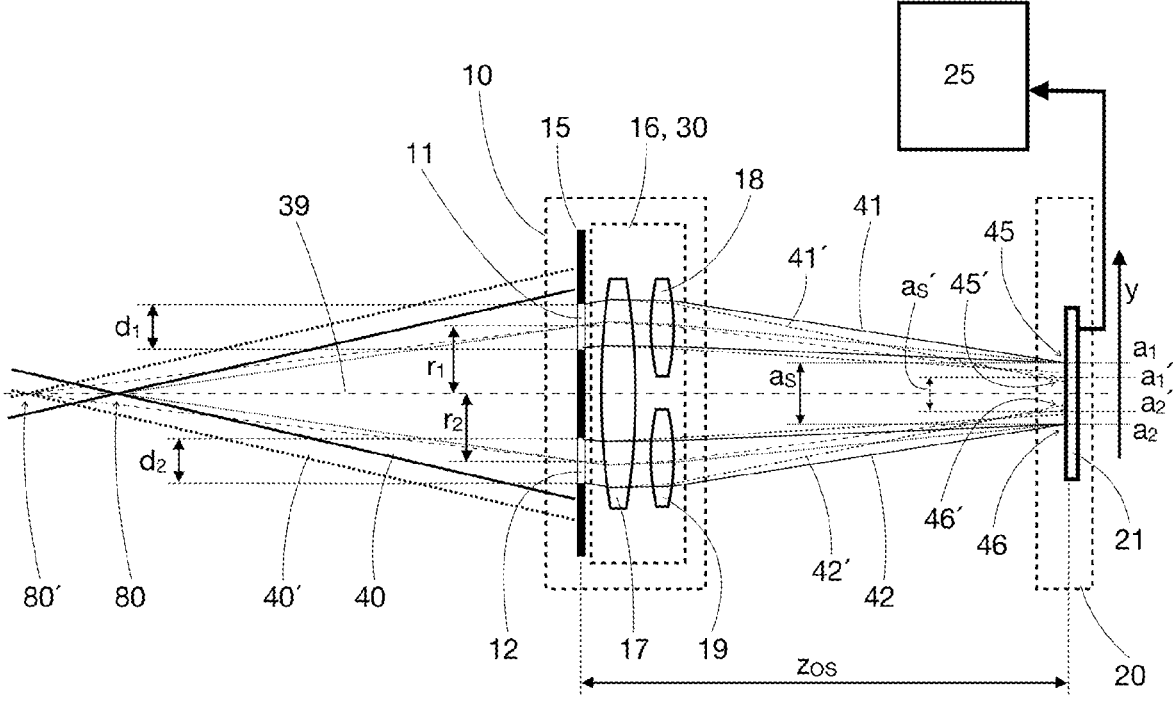
FIG. 15 shows a schematic illustration of a ninth form of embodiment of the focal position sensor.

A further, easily configurable, form of embodiment of a focal position sensor according to the present disclosure is shown in FIG. 15. The imaging device 16 here comprises at least three imaging optical elements 17, 18, 19, all of which are designed as converging lenses. Of these, the lens 17 extends laterally over both selection devices 11 and 12, that is to say, over both selected partial aperture regions, and thus has a focussing effect on the partial beams 41 and 42. Compared with the forms of embodiment of FIG. 12, 13 or 14, the refractive power of the lens 17 is selected to be lower, that is to say, the focal length of the lens 17 is selected to be greater. Therefore, the lens 17 alone would focus the partial beams 41 and 42 onto a plane located behind the detector unit. Therefore, in each beam path of the partial beams 41 and 42, another lens 18, 19 is located, such that the partial beams 41, 42 are effectively imaged onto the detector unit 20. However, since the convergence point or superposition point of the partial beams 41, 42 are determined only by the focal length of the lens 17 and are therefore located behind the detector unit 20, the beam spots 45, 46 formed by the partial beams 41, 42 are spatially separated from each other on the detector unit 20. Here the imaging device 16 and the beam separator device 30 thus form a functional unit.

Figure 16:
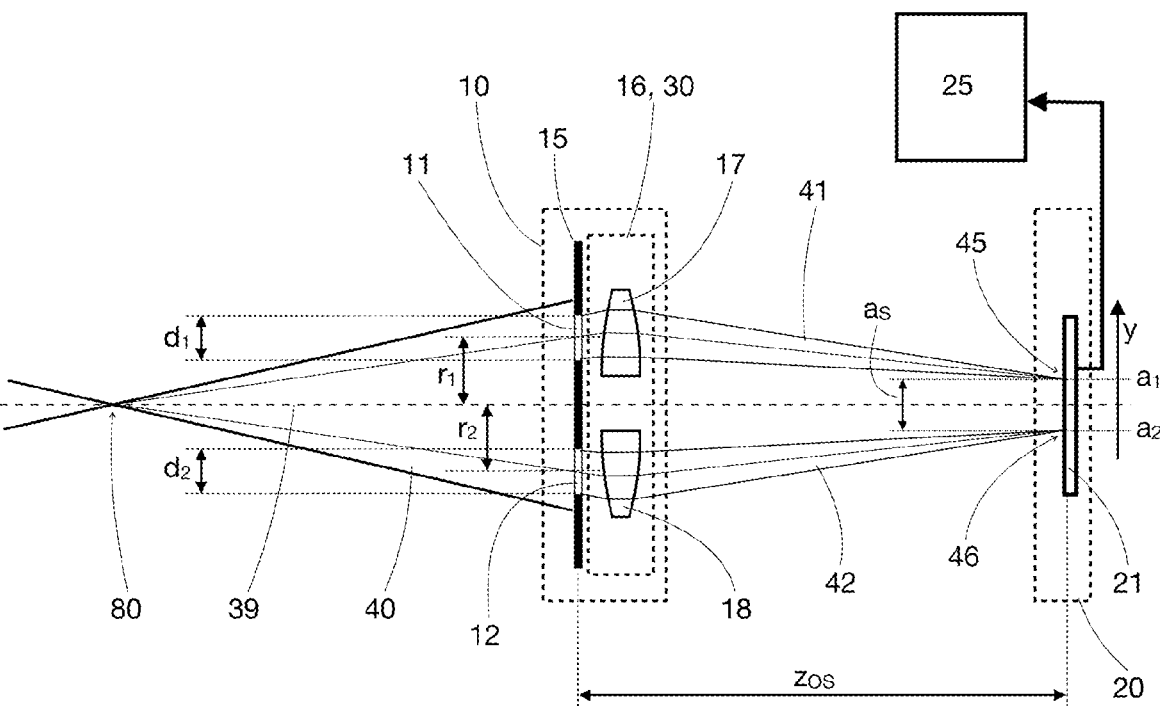
FIG. 16 shows a schematic illustration of a tenth form of embodiment of the focal position sensor.

The focal position sensor shown in FIG. 16 is similar in principle to the focal position sensor of FIG. 15. Here the imaging device 16 and the beam separator device 30 similarly form a functional unit. The first partial beam 41 is imaged onto the detector unit 20 by means of an imaging optical element 17, wherein the imaging optical element 17 is designed as a wedge lens. Due to the additional wedge effect, the partial beam 41 is focussed on a point laterally displaced from the optical axis 39. Accordingly, the second partial beam 42 is imaged onto the detector unit 20 by a further imaging optical element 18 designed as a wedge lens, whereby the beam spots 45, 46 are spatially separated on the detector 21.

Figure 17:
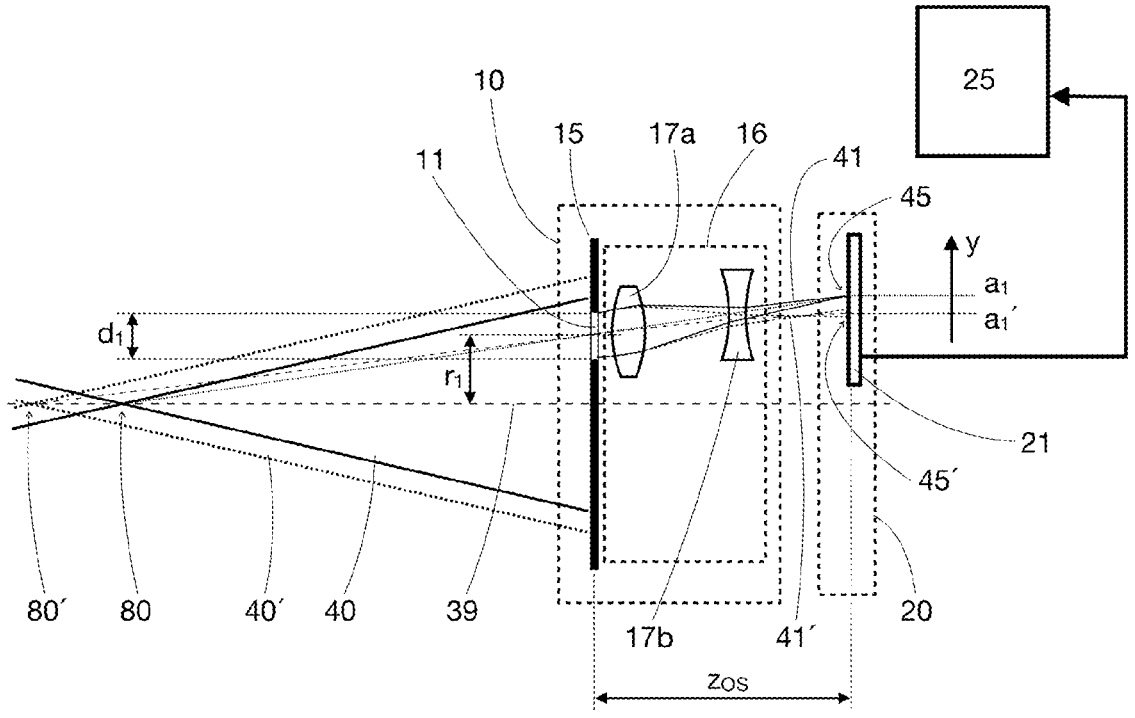
FIG. 17 shows a schematic illustration of an eleventh form of embodiment of the focal position sensor with a shortening of the distance from the partial beam imaging device to the detector unit by optics.

FIG. 17 shows an option for making the focal position sensor more compact. In order to achieve a high sensitivity to focal position changes of the measurement beam 40, a large distance zos between the partial beam imaging device 10 and the detector unit 20 is advantageous, which is contrary to a compact design. For this purpose, in the form of embodiment shown in FIG. 17, the imaging device 16 is constructed with a two-part imaging function, that is to say, the imaging device 16 comprises at least two optical elements 17a and 17b, arranged one behind another. Of these, the element 17a, arranged first in the beam direction, has a positive refractive power, and the second element 17b has a negative refractive power. Together, the elements 17a and 17b form a telephoto-lens-type imaging unit, that is to say, the back focal distance is shorter than the total effective focal length. In this manner, the distance zos is significantly shortened, without reducing the sensitivity of the focal position sensor.

Figure 18:
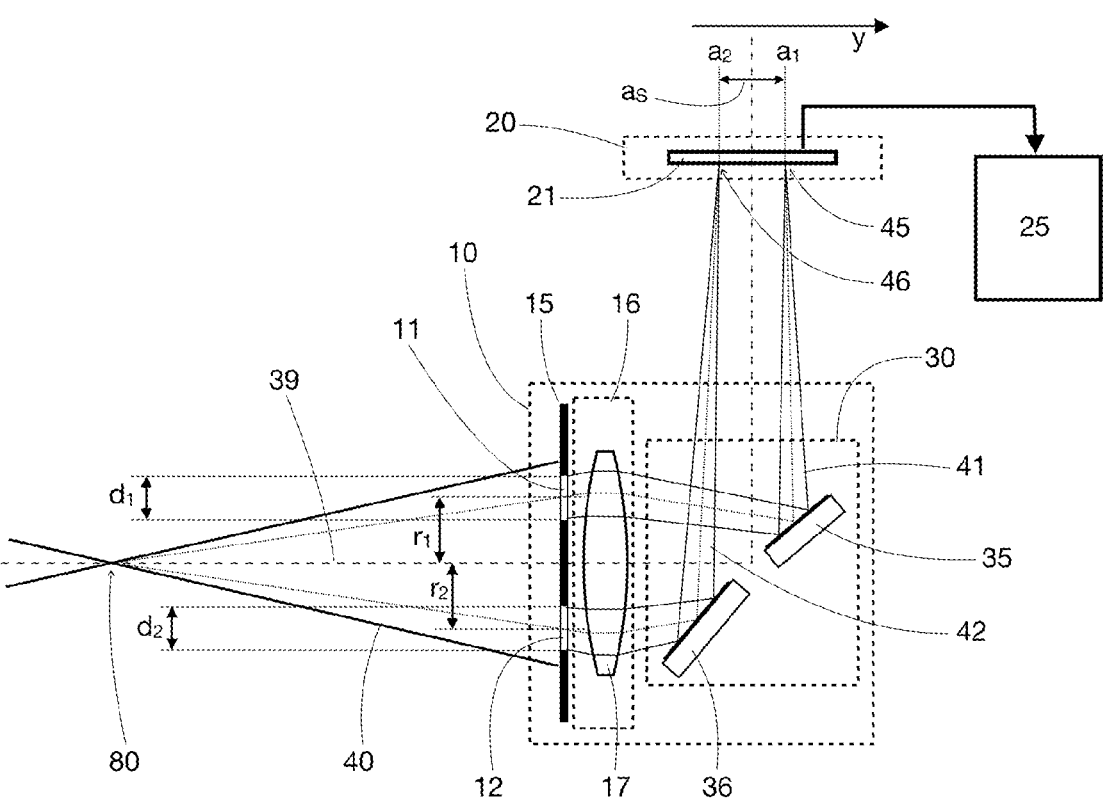
FIG. 18 shows a schematic illustration of a twelfth form of embodiment of the focal position sensor.

FIG. 18 shows a focal position sensor similar to the form of embodiment of FIG. 14. Here, the beam separator device 30 comprises a mirror arrangement 35, 36. The individual partial beams 41 and 42 are each deflected through approximately 90° by a mirror 35, 36. Here the exact angular position of the mirrors 35 and 36 deviates from the 45° position by a defined, or adjustable, small amount in a different direction in each case, such that the beam spots 45 and 46 are laterally offset on the detector unit 20. By the selection of the setting angles of the mirrors 35, 36, the basic value for the beam spot spacing as can be adjusted in a simple manner. This allows the device to be easily adapted to different sizes of detector 21, or to different camera modules that can be used in the detector unit.

Figure 19:
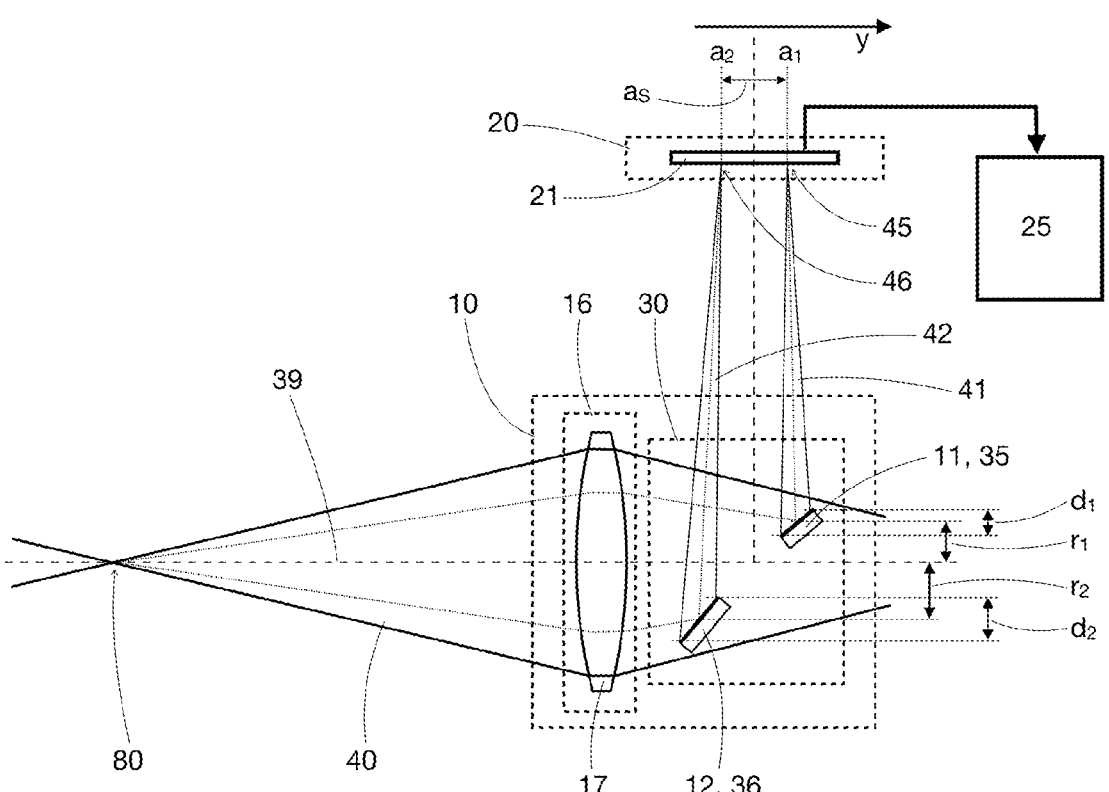
FIG. 19 shows a schematic illustration of a thirteenth form of embodiment of the focal position sensor.

FIG. 19 shows a focal position sensor that, from a functional point of view, acts in a similar manner to that illustrated in FIG. 18. The beam separator device 30 is likewise implemented in the form of a mirror arrangement 35, 36. Since the partial beams 41 and 42 are deflected out of the original propagation direction by means of the mirrors 35, 36, the beam separator device 30 with the mirror arrangement 35, 36 here has, at the same time, the functionality of the selection devices 11 and 12. The first selection device 11 is here formed by the rim of the mirror 35, and the second selection device 12 is formed by the rim of the mirror 36. An aperture device 15 as in FIG. 18 can therefore be omitted, without any restrictions on functionality.

Figure 20:
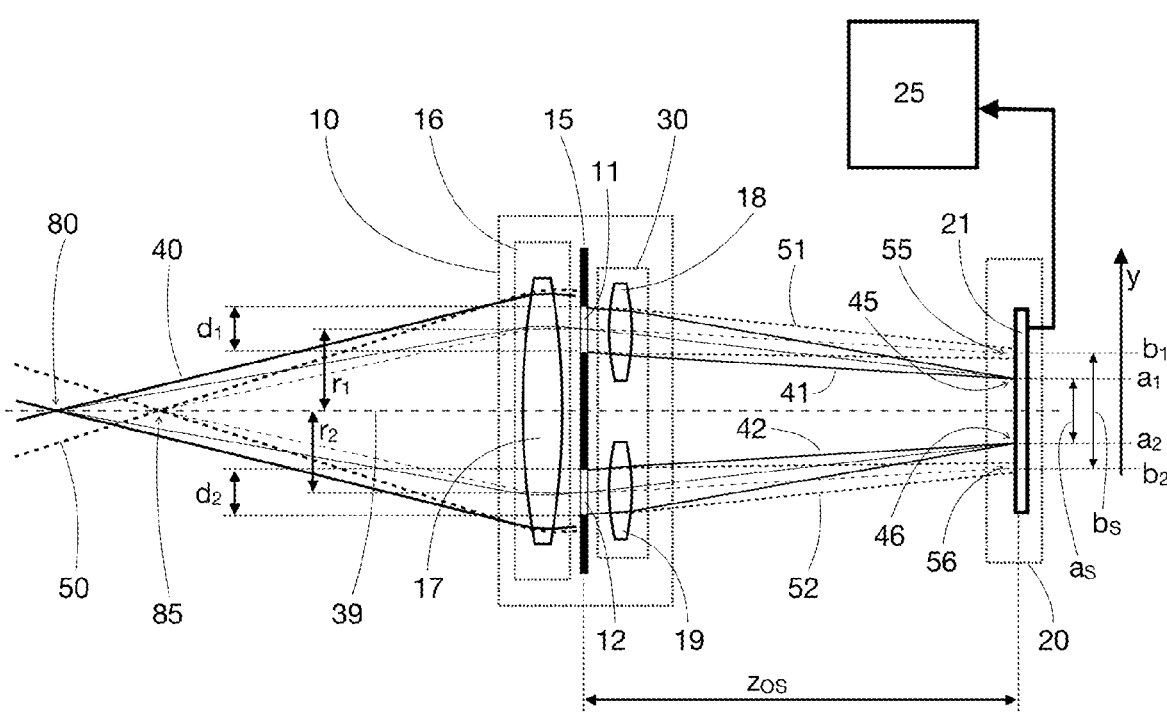
FIG. 20 shows a schematic illustration of a form of embodiment of the focal position sensor similar to the ninth form of embodiment shown in FIG. 15. In the example shown here, the focal position sensor receives two superimposed measurement beams with different intermediate focal positions.

FIG. 20 shows in principle the same form of embodiment of the focal position sensor as in FIG. 15. In contrast to FIG. 15, the focal position sensor is used here to monitor two different measurement beams simultaneously, that is to say, the partial beam imaging device 10 is here configured to receive a first measurement beam 40 and a second measurement beam 50. The measurement beams 40 and 50 are superimposed on the same optical axis. The second measurement beam 50 has a different focal position, or position of the intermediate focus 85, from that of the first measurement beam 40. The selection devices 11 and 12 of the partial beam imaging device 10 generate the first partial beam 41 and the second partial beam 42 from the first measurement beam 40, and, at the same time, generate the partial beams 51 and 52 from the second measurement beam 50. The partial beams 51, 52 have a different angle to the optical axis 39 to that of the partial beams 41 and 42 from the first measurement beam 40, due to the different axial intermediate focal position 85 of the second measurement beam 50. Thus, the beam spots 55, 56 formed by the partial beams 51 and 52 are located at different lateral positions $b_1$ and $b_2$ after imaging by means of the imaging device 16 with the lens 17, and by means of the partial aperture lenses 18, 19, onto the detector unit 20, and have a separation distance bs that differs from the lateral positions $a_1$ and $a_2$ and the separation distance as of the beam spots 45 and 46 generated from the first measurement beam 40. Since all beam spots 45, 46, 55, 56 are spatially separated on the sensor 20, all beam spots 45, 46, 55, 56 can be identified by the evaluation unit 25 and the lateral positions $a_1$, $a_2$, $b_1$, $b_2$ of the beam spots can be determined by the evaluation unit 25. The beam spots respectively belonging to the same measurement beam are on the one hand the inner beam spots, and on the other hand the outer beam spots, so that the respective separation distances as and bs can also be determined unambiguously by the evaluation unit 25.

Figure 21:
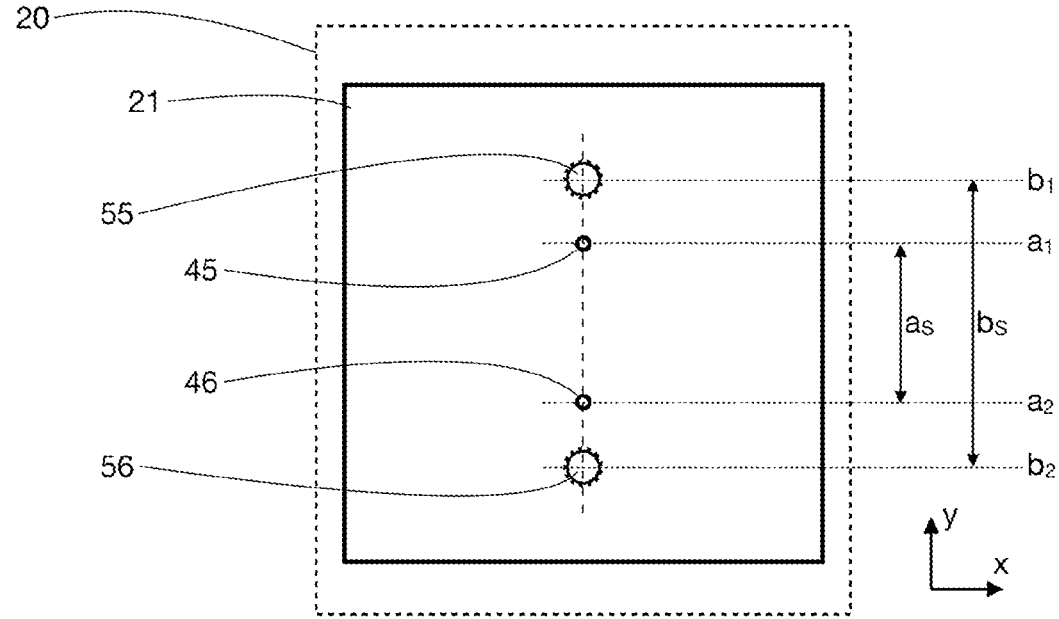
FIG. 21 shows a schematic illustration of the beam spot positions on the detector unit with a plurality of beam spots generated by two superimposed measurement beams, according to a form of embodiment as shown in FIG. 20.

In FIG. 21, the beam spot image on the detector 21 belonging to the form of embodiment of FIG. 20 is schematically shown in a plan view of the detector unit 20.

If the beam spots on the detector formed from different measurement beams 40, 50 have very different extents, the intensity of the beam spots can also be very different. This can have an unfavourable effect on the accuracy when determining the lateral positions of the beam spots.

Figure 22:
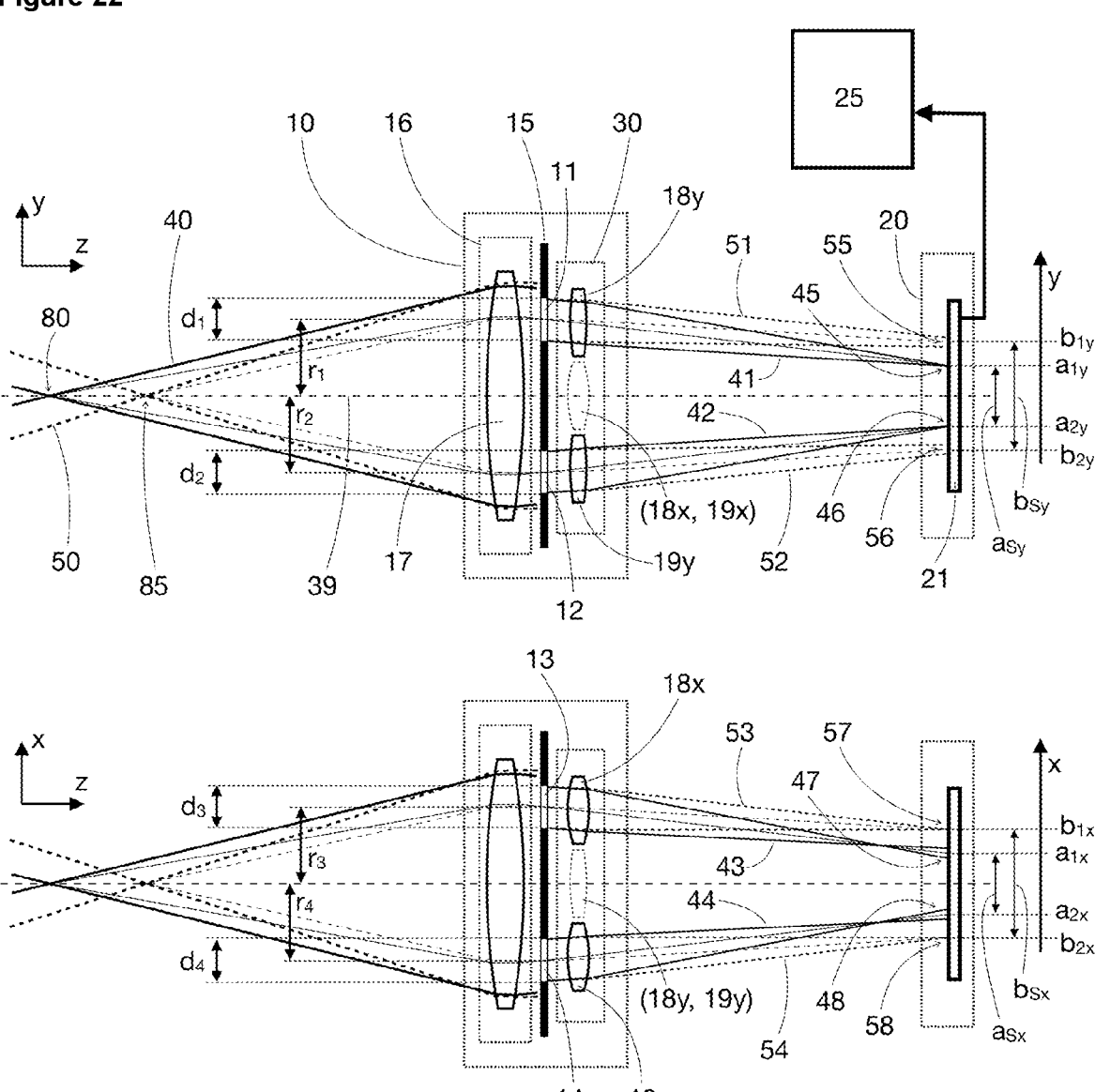
FIG. 22 shows a schematic illustration in two sections of a form of embodiment of a focal position sensor similar to the form of embodiment shown in FIG. 20, in which the focal position sensor receives two superimposed measurement beams with different intermediate focal positions. For improved evaluation, additional selection devices are arranged in an additional lateral direction in this example.
Figure 23:
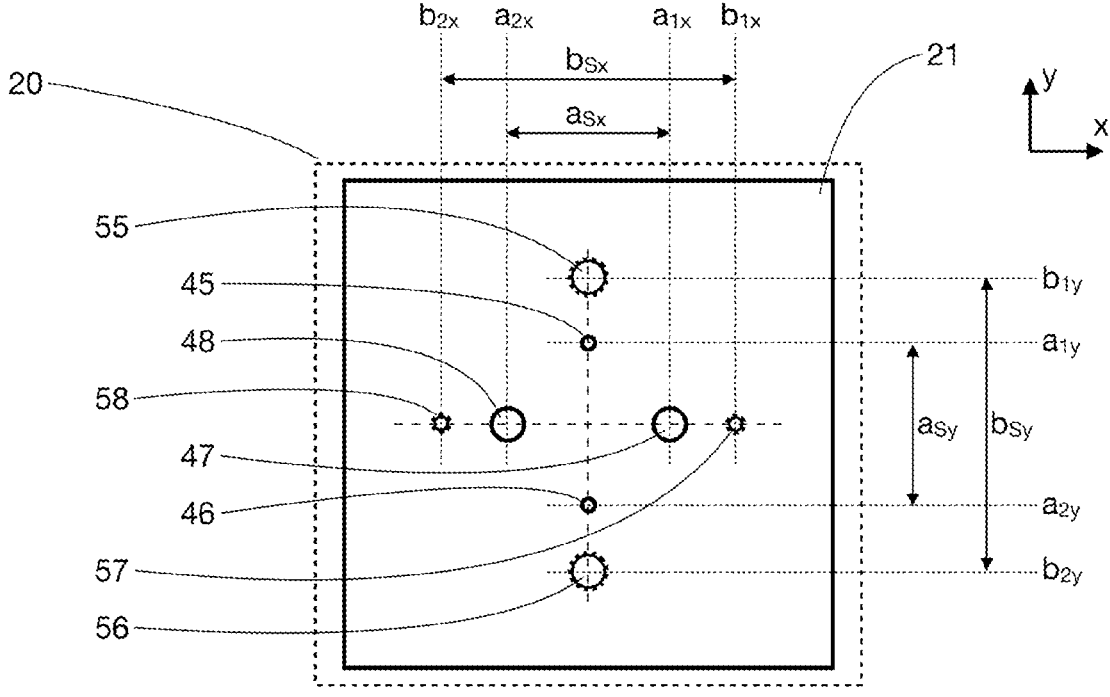
FIG. 23 shows a schematic illustration of the beam spot positions on the detector unit with a plurality of beam spots generated by two superimposed measurement beams, for a focal position sensor as shown in FIG. 22.

Forms of embodiment of the focal position sensor are therefore also provided, in which the partial beam imaging device 10 has, in addition to the selection devices 11, 12, further selection devices 13, 14 for generating additional partial beams 47, 48, 57, 58. FIG. 22 shows such a form of embodiment, and FIG. 23 shows the corresponding beam spot image on the detector. In order to achieve a suitable spatial separation of the beam spots generated by the partial beams by the further selection devices 13, 14, the further selection devices 13, 14 are arranged along a different lateral direction. For example, the selection devices 11 and 12 already described are arranged along the y-coordinate in the partial beam imaging device 10, while the further selection devices 13 and 14 are arranged along the x-coordinate in the partial beam imaging device 10. In FIG. 22, the focal position sensor is shown in two corresponding sections. While in the upper illustration of the y-z section the selection devices 11 and 12 as well as the partial aperture lenses 18y and 19y arranged behind the latter are located in the drawing plane, the further selection devices 13 and 14 are arranged outside the drawing plane. The further selection devices 13 and 14 are accordingly shown in the lower illustration of the x-z section of FIG. 22. The centres of the selection devices 13, 14 each have a radial distance $r_3$, $r_4$ from the optical axis 39. The selection devices 13, 14, and thus also the corresponding selected partial aperture regions, each have a respective width $d_3$, $d_4$ in the radial direction. Further partial aperture lenses 18x and 19x are arranged behind the further selection devices 13 and 14. The further partial aperture lenses 18x and 19x have a different focal length from that of the partial aperture lenses 18y and 19y. In the illustrated example of embodiment, the refractive power of the partial aperture lenses 18x and 19x is greater than the refractive power of the partial aperture lenses 18y and 19y. It is thereby achieved that the partial beams 53 and 54 generated by the selection devices 13 and 14 from the second measurement beam 50 are focussed more strongly, that is to say, at a shorter distance, than the partial beams 51 and 52 from the same measurement beam 50. For example, the focal length of the partial aperture lenses 1Bx and 19x is selected such that the foci of the partial beams 53 and 54 are generated approximately in the plane of the detector unit 20, and thus the beam spots 57 and 58 formed by the partial beams 53 and 54 have a minimum size. Thus, the lateral positions $b_{1x}$ and $b_{2x}$ of the beam spots 57, 58 in the x-coordinate can be determined with the same accuracy as the lateral positions $a_{1y}$ and $a_{2y}$ of the beam spots 45, 46 in the y-coordinate. Accordingly, the separation distance $b_{Sx}$ of the beam spots from the second measurement beam 50 along the x-coordinate can also be determined with the same accuracy as the separation distance $a_{Sy}$ of the beam spots from the first measurement beam 40 along the y coordinate.

Figure 24:
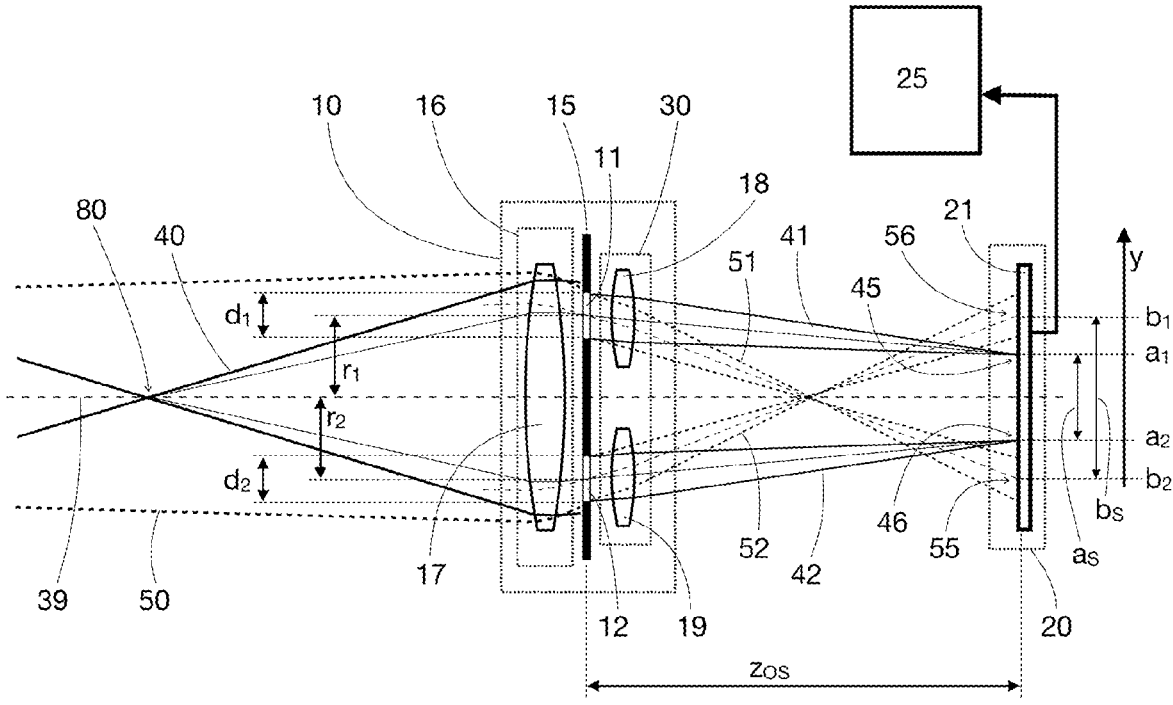
FIG. 24 shows a schematic illustration of a form of embodiment of the focal position sensor similar to the ninth form of embodiment shown in FIG. 15. In the example shown here, the focal position sensor receives two superimposed measurement beams with very different intermediate focal positions.

In FIG. 23, the beam spot image on the detector 21 belonging to the form of embodiment of FIG. 22 is shown schematically in a plan view of the detector unit 20. The focal position sensor can also be configured so as to evaluate two superimposed measurement beams 40 and 50, whose original focal positions, or intermediate focal positions, are axially very far apart from one another. For example, one of the two measurement beams can also be collimated or approximately collimated. A suitable configuration of the focal position sensor is shown in FIG. 24. The focal position sensor is identical to the focal position sensor shown in FIG. 20. Only the paths of the partial beams 51 and 52, which are generated from the second measurement beam 50, are different. The partial beams 51, 52 are here much more strongly inclined, by virtue of the focussing by the imaging device 16, since the exemplary second measurement beam 50 is almost collimated, that is to say, is only slightly divergent. In order to position all beam spots 45, 46, 55, 56, with not too much distance between them, on a single detector 21, it is possible to take advantage of the crossing over of the partial beams 51 and 52 between the partial beam imaging device 10 and the detector unit 20.

Figure 25:
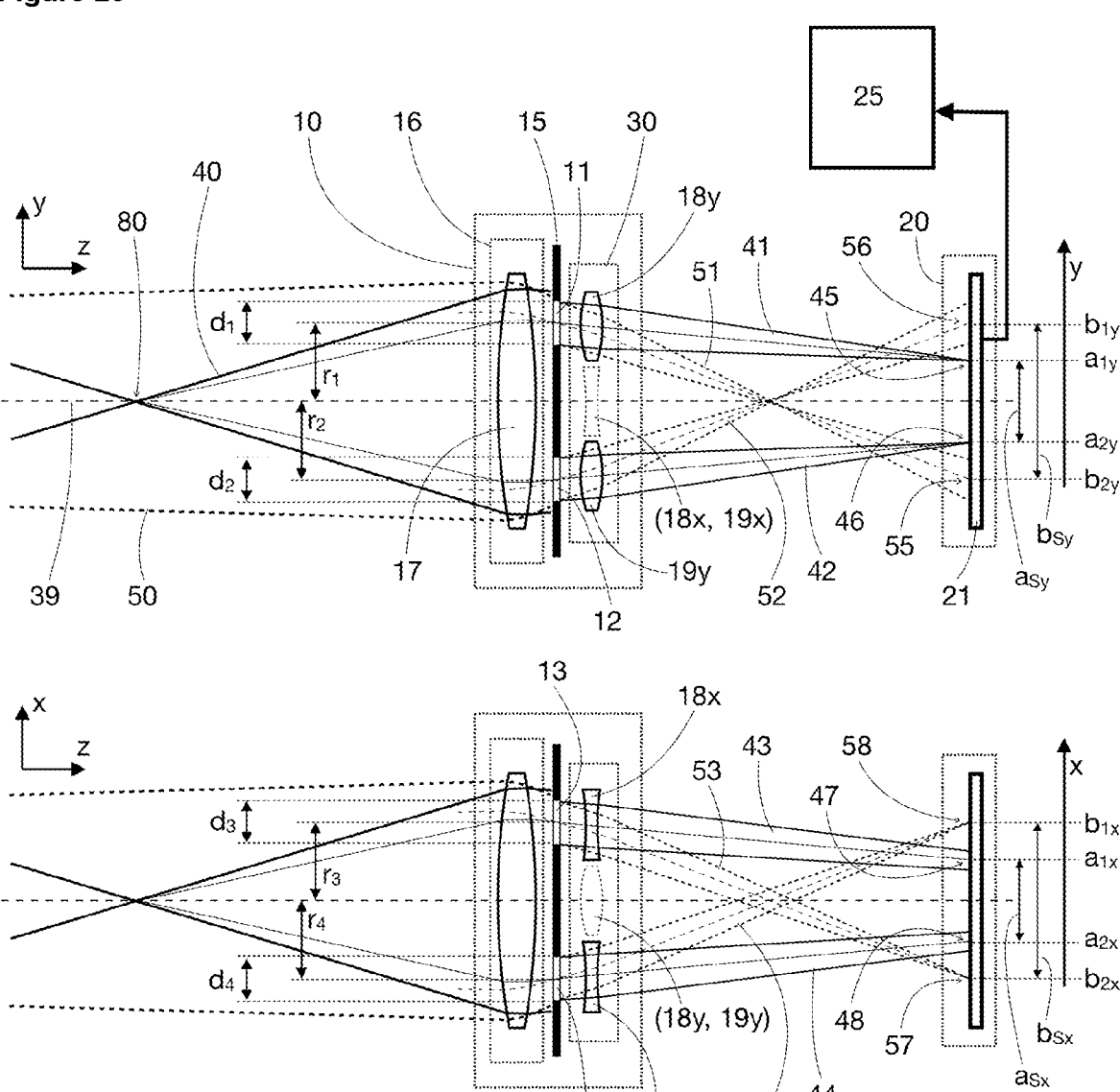
FIG. 25 shows a schematic illustration in two sections of a form of embodiment of a focal position sensor similar to the form of embodiment shown in FIG. 24, in which the focal position sensor receives two superimposed measurement beams with very different intermediate focal positions. For improved evaluation, additional selection devices are arranged in an additional lateral direction, similar to the form of embodiment shown in FIG. 22. In this example, the beam separator device comprises partial aperture lenses in the two lateral coordinate directions with significantly different focal lengths.

FIG. 25 shows a focal position sensor similar to the form of embodiment of FIG. 22. Here, the focal position sensor is adapted to the monitoring of two very different measurement beams 40 and 50. The y-z section here is constructed in the same manner as the y-z section of FIG. 22. In order to generate optimum beam spot dimensions on the detector unit 20 here also for the partial beams of both measurement beams in the respective coordinate directions, the partial aperture lenses 18x and 19x, which are shown in the x-z section, here have a negative refractive power, that is to say, a negative focal length, so as to displace the foci of the partial beams 53 and 54 backwards such that the foci are located approximately in the plane of the detector unit 20.

Figure 26:
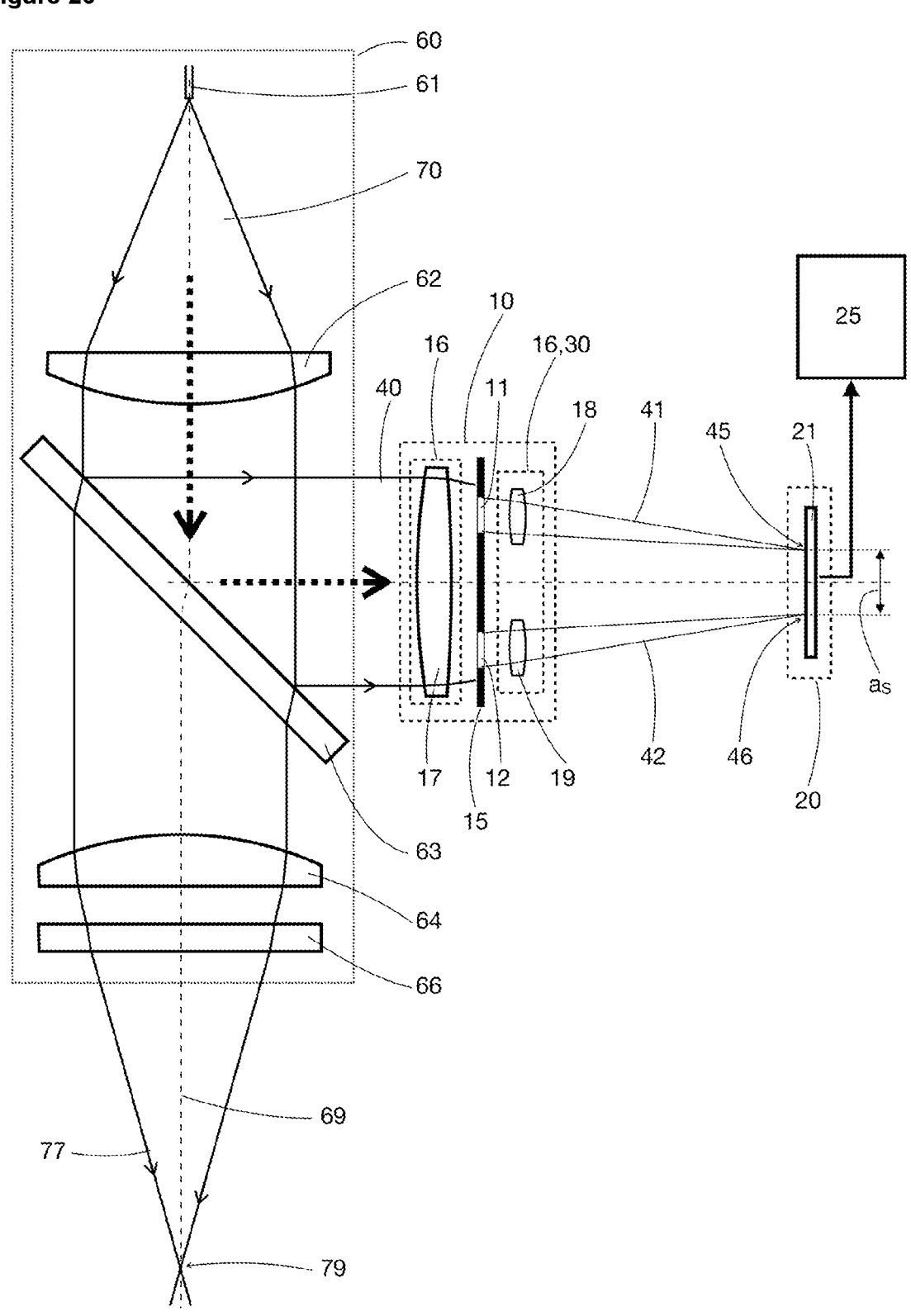
FIG. 26 shows a schematic illustration of an optical system with a laser optics and a focal position sensor, in which the focal position sensor evaluates a partially-reflected beam which is affected in particular by the collimation part of the laser optics.

FIG. 26 shows an optical system according to the present disclosure with a laser optics 60, and with a focal position sensor to monitor changes of the focal position of the laser optics 60. The laser optics typically comprises collimator optics 62 and focussing optics 64. To protect the focussing optics 64 from smoke and splashes that can occur during laser material processing, a replaceable protective glass 66 is usually arranged downstream of the focussing optics. A laser beam 70 is, for example, emitted from an optical fibre end 61 and imaged by the laser optics 60 into a laser beam focus 79. A partially-reflecting beam splitter 63 is arranged between the collimator optics 62 and the focussing optics 64. This can be, for example, an anti-reflection coated inclined plane plate. Due to the residual reflection at the beam splitter 63, a fraction of the collimated laser beam 70 is coupled out laterally. The laterally coupled out beam forms the measurement beam 40 for the focal position sensor, which is arranged laterally at the beam splitter outlet of the laser optics 60. The partial beam imaging device 10 of the focal position sensor is designed in an exemplary manner in the optical system shown here, as in the focal position sensor according to FIG. 15 or 20. However, any other form of embodiment of the focal position sensor can also be used. The bold dashed arrows in the figure illustrate the path of the beam from the laser beam source, in this case the optical fibre end 61, to the measurement beam 40. The measurement beam 40 is thus affected here only by the collimator optics 62 of the laser optics 60. In this form of embodiment, the focal position sensor consequently monitors focal position changes caused in particular by the collimator optics 62, for example by the power-induced thermal focus shift of the collimator optics 62.

Figure 27:
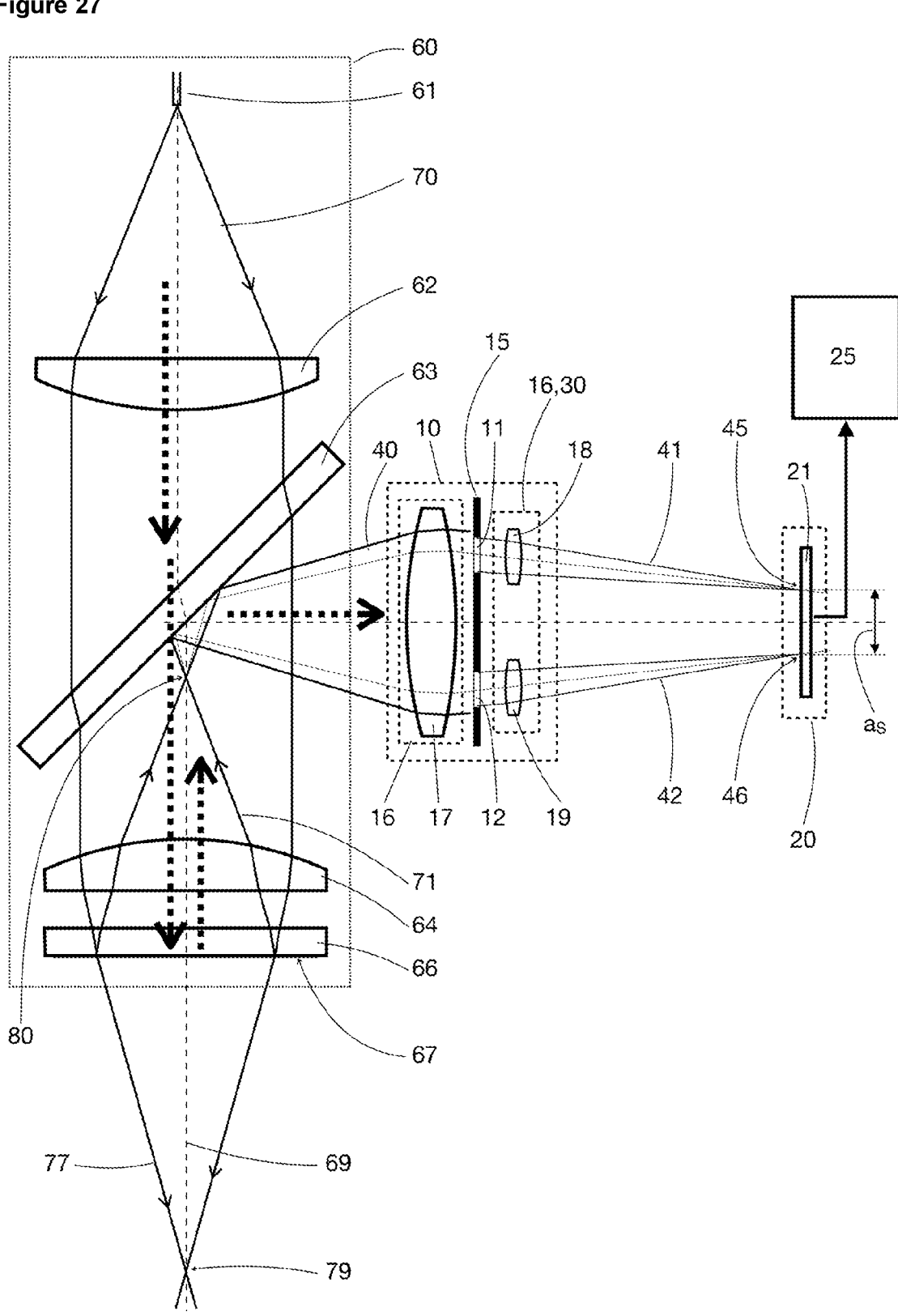
FIG. 27 shows a schematic illustration of an optical system with a laser optics and a focal position sensor, in which the focal position sensor evaluates a partially-reflected beam that is affected by the entire laser optics.

FIG. 27 shows another optical system according to the present disclosure, with a laser optics 60 and a focal position sensor to monitor focal position changes of the laser optics 60. As in the example of FIG. 26, the laser optics 60 typically comprises collimator optics 62, focussing optics 64, and a protective glass 66. The laser beam 70 is emitted from the optical fibre end 61 and imaged by the laser optics 60 into a laser beam focus 79. A fraction of the laser beam 70 is reflected from the outer interface 67 of the protective glass 66 of the laser optics 60, so that a partially-reflected beam 71 is generated. Here it is sufficient if the residual reflection of a reflection-reducing coating layer is utilised for this purpose. The partially-reflected beam 71 propagates coaxially, counter to the beam direction of the laser beam 70, back into the laser optics 60 and forms an intermediate focus 80. A partially-reflecting beam splitter 63 is arranged between the collimator optics 62 and the focussing optics 64. This can be an inclined plane plate with an anti-reflection coating. Due to the residual reflection at the beam splitter 63, the partially-reflected beam 71, or a fraction of the latter, is coupled out laterally. The laterally coupled out beam forms the measurement beam 40 for the focal position sensor, which is arranged laterally at the beam splitter exit of the laser optics 60. In the optical system shown here the partial beam imaging device 10 of the focal position sensor is designed in an exemplary manner as in the focal position sensor according to FIG. 15 or 20. However, any other form of embodiment of the focal position sensor can also be used. By virtue of the partial reflection at the last interface 67, the position of the intermediate focus 80 is optically coupled to the position of the laser beam focus 79, that is to say, changes in the focal position of the laser beam focus 79 simultaneously cause an alteration in the focal position of the intermediate focus 80, whose position is monitored by the focal position sensor. In this way, the focal position sensor monitors the axial position of the laser beam focus 79.

The bold dashed arrows in the figure illustrate the path of the beam from the laser beam source, in this case the optical fibre end 61, to the measurement beam 40. The measurement beam 40 is thus affected here by all elements of the laser optics 60, wherein a part of the laser optics, namely the focussing optics 64 and the protective glass 66, is traversed forwards and backwards, that is to say, twice. Consequently, in this form of embodiment, the focal position sensor detects focal position changes caused by all elements of the laser optics 60. Thus, all contributions to the thermal focus shift of the laser optics 60, that is to say, from the collimator optics 62, the beam splitter 63, from the focussing optics 64, and the protective glass 66, are registered by the focal position sensor.

Figure 28:
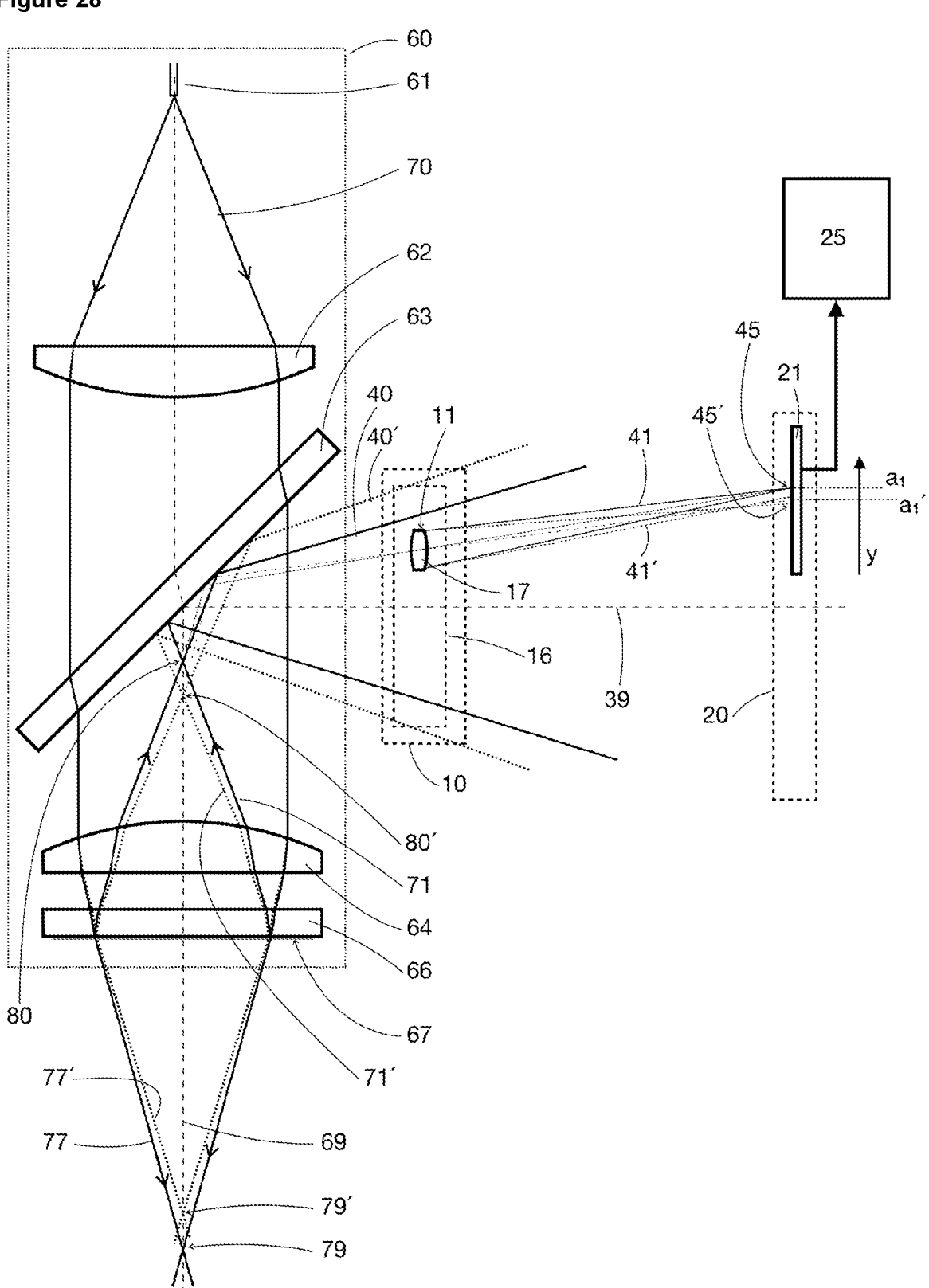
FIG. 28 shows a schematic illustration of an optical system with a laser optics and with a focal position sensor as in FIG. 1 or 2 with only one selection device. In addition, a focal position of the laser beam of the laser optics altered by a thermal focus shift is shown, as are the thereby altered beams in the focal position sensor.

FIG. 28 schematically illustrates the detection of an alteration in the axial position of the laser beam focus 79 of the laser optics 60 by the focal position sensor. The laser optics 60 and the generation of the measurement beam 40 are identical to the optical system shown in FIG. 27. The focal position sensor is shown here in an exemplary manner as a focal position sensor with a simple partial beam imaging device 10 with only one selection device 11, corresponding to a focal position sensor according to FIG. 1 or 2. However, any other form of embodiment of the focal position sensor can also be used. The beams, altered, for example, by a thermal focus shift, are indicated by reference symbols marked with a dash. A thermal focus shift typically increases the refractive power of the optical elements; thus the focussed laser beam 77 becomes more strongly focussed and the position of the laser beam focus 79 is displaced closer to the laser optics 60 to become the displaced laser beam focus 79'. Consequently, the partially-reflected beam 71 from the interface 67 of the protective glass 66 also becomes more strongly focussed, represented by the partially-reflected beam 71', so that the position of the intermediate focus 80 (the displaced intermediate focus 80') is also displaced axially. In the focal position sensor, this changes the lateral position of the beam spot 45. The displaced beam spot 45' is located closer to the optical axis 39. The displaced beam spot 45' is moreover enlarged, since the axial focal position has also altered for the displaced partial beam 41'.

Figure 29:
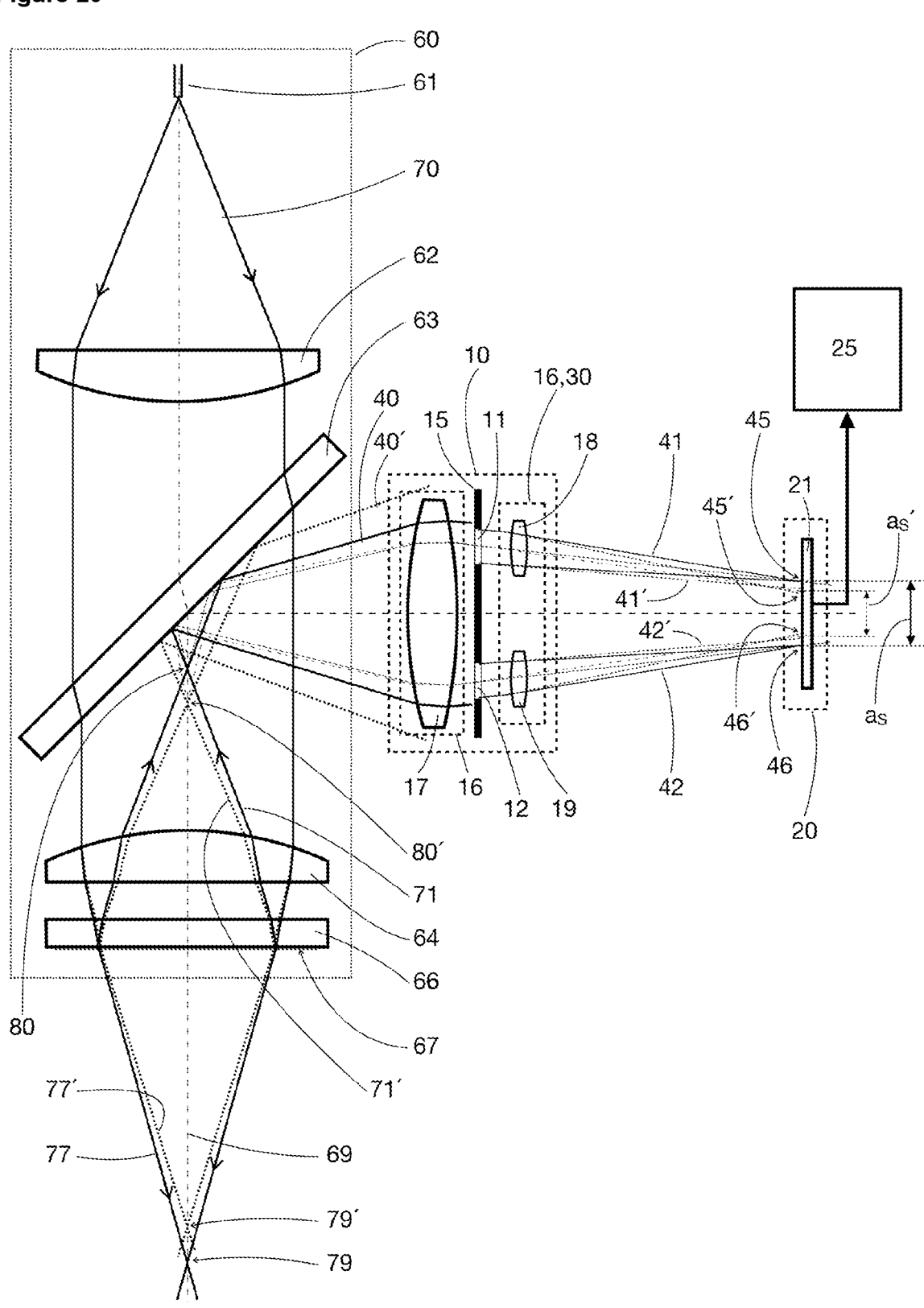
FIG. 29 shows a schematic illustration of an optical system with a laser optics and a focal position sensor as in FIG. 15 with two selection devices, and with an additional illustration of a focal position of the laser beam altered by thermal focus shift, and the thereby altered beams in the focal position sensor.

FIG. 29 depicts the same situation as FIG. 28, except that, by way of example, a focal position sensor is used with a different partial beam imaging device 10, which here uses two selection devices 11, 12. The focal position sensor can therefore detect changes in the laser beam focus 79, 79' not only on the basis of the changes in the lateral positions of the beam spots 45, 45', 46, 46', but also on the basis of the change in the separation distance as, as' between the beam spots 45 and 46, and 45' and 46', respectively.

Figure 30:
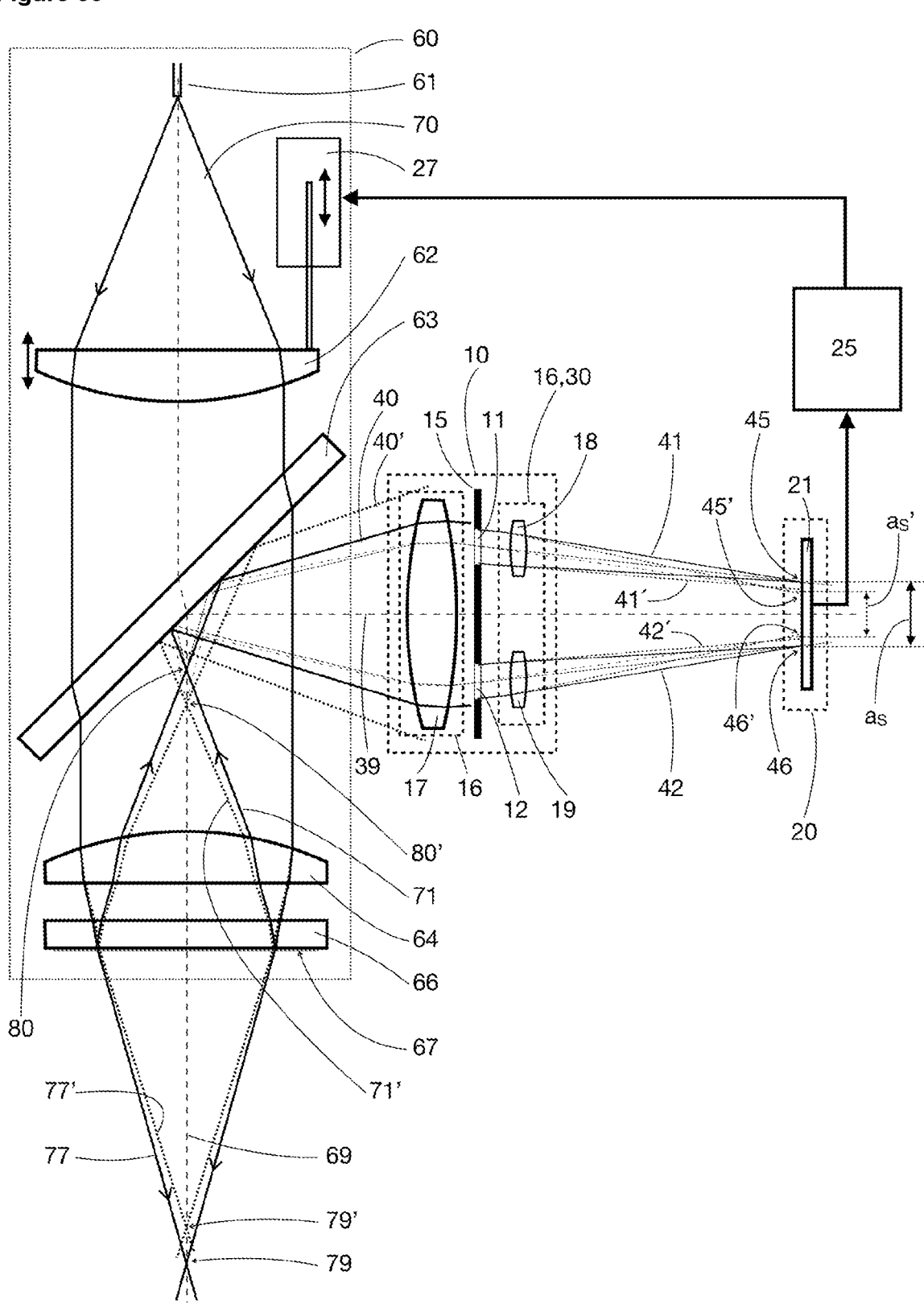
FIG. 30 shows a schematic illustration of an optical system with a laser optics and a focal position sensor as in FIG. 29. In this example of embodiment, the laser optics additionally has a movably mounted and controllable lens group, by means of which the focal position of the laser beam can be adjusted and tracked.

Furthermore, forms of embodiment of the optical system are envisaged, in which the position of the laser beam focus 79 of a laser optics 60 can be actively tracked. One possible form of embodiment is shown in FIG. 30. The laser optics 60 comprises an axially movable lens, or lens group. In the example shown, this is the collimator optics 62. The movable lens is coupled to a drive unit, here with a translation device 27, by means of which the position of the movable lens is adjusted. The translation device 27 is controlled, for example, by the evaluation unit 25 as a function of the change determined in the lateral beam spot position or the beam spot separation distance as. A further control device can also be interposed between the evaluation unit 25 and the translation device 27; this can, for example, be a regulator, or a higher-level programmable controller.

Figure 31:
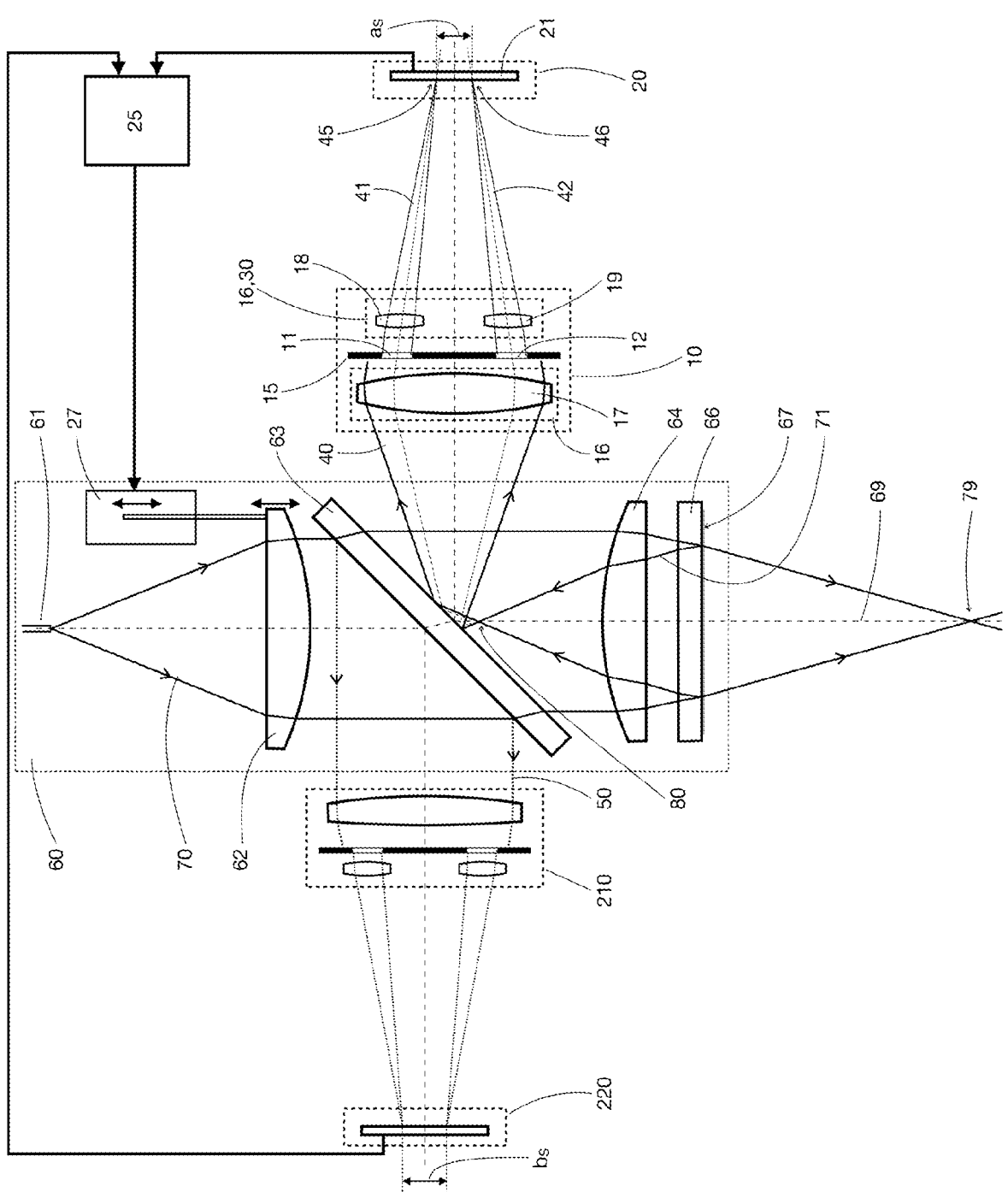
FIG. 31 shows a schematic illustration of an optical system with a laser optics and with two focal position sensors. One focal position sensor receives a measurement beam which is partially reflected by the outer interface of the protective glass, while another focal position sensor receives a measurement beam that is coupled out before the focussing of the laser optics.

FIG. 31 shows a form of embodiment of the optical system in which a second focal position sensor is additionally arranged on the other side of the exit from the beam splitter 63 of the laser optics 60. In other respects, the optical system corresponds to the form of embodiment of FIG. 30. The second focal position sensor comprises a further partial beam imaging device 210 and a further detector unit 220. The evaluation unit 25 of the first focal position sensor is additionally connected to the detector unit 220 of the second focal position sensor and registers its signals. In other respects the second focal position sensor can correspond to any form of embodiment of the focal position sensor according to the present disclosure. The second focal position sensor receives a second measurement beam 50, which is formed from a partial reflection of the laser beam 70 at the beam splitter 63. This second measurement beam 50 has only passed through the collimator optics 62 on its propagation path through the laser optics, so that the second measurement beam is only affected by thermal changes and/or changes in the position of the collimator optics 62. In contrast, the measurement beam 40, received by the first focal position sensor, has passed through the collimator optics 62, the beam splitter 63, the focussing optics 64, the protective glass 66, and on its return path a second time through the protective glass 66 and the focussing optics 64, on its propagation path through the laser optics 60. Thus, by comparing the changes in lateral beam spot positions or beam spot spacing as from the detector unit 20 of the first focal position sensor with the changes in lateral beam spot positions or beam spot spacing bs from the detector unit 220 of the second focal position sensor, the evaluation unit 25 can determine whether an alteration in the position of the laser beam focus 79 is due to a thermal lens in the domain of the collimator optics 62, or to thermal lenses in the domain of the focussing optics 64 and the protective glass 66. This information, that is to say, this differentiation, can be used to track more accurately the focal position of the laser beam focus 79.

Figure 32:
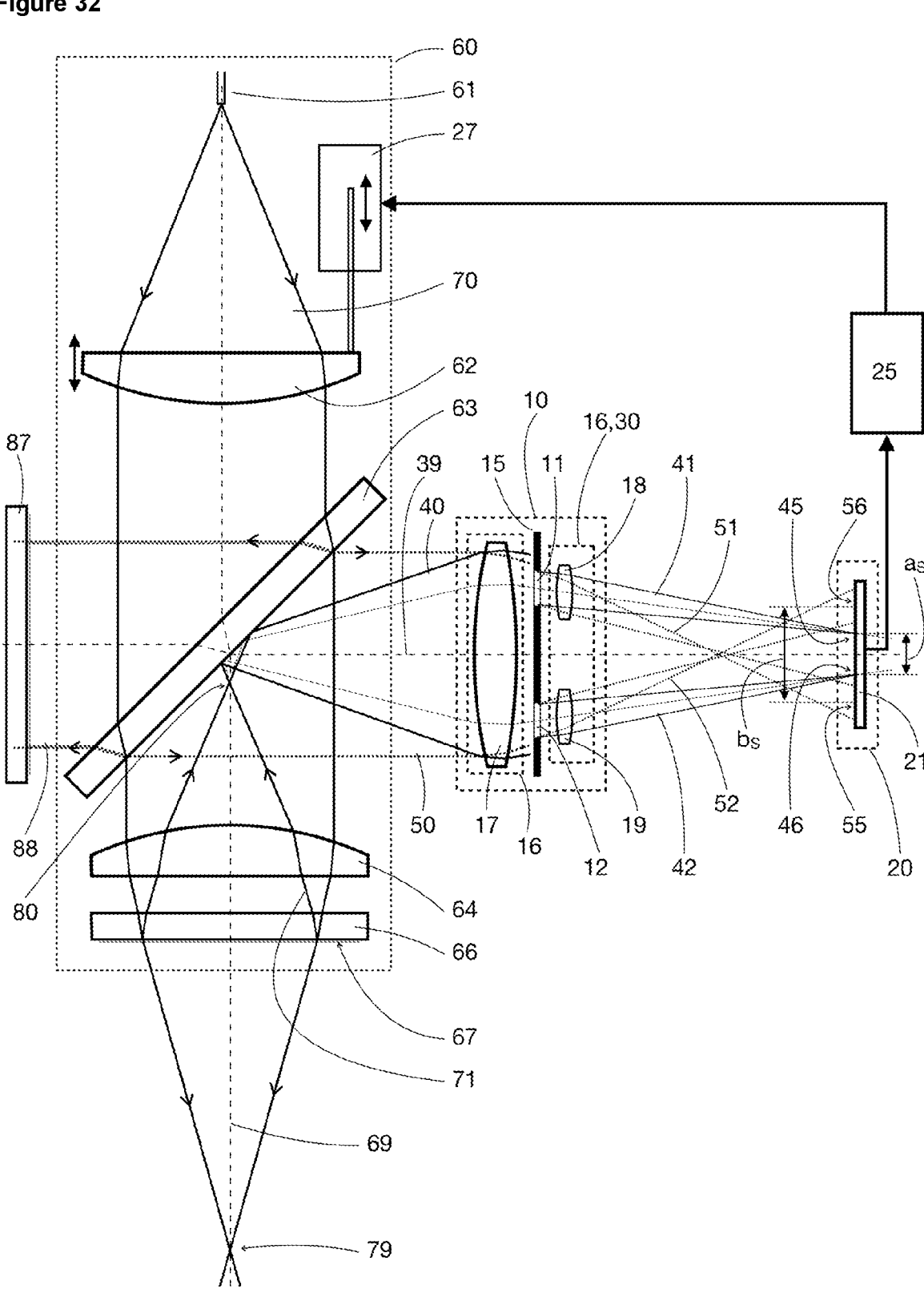
FIG. 32 shows a schematic illustration of an optical system comprising a laser optics and a focal position sensor. In this exemplary embodiment, the focal position sensor receives two superimposed measurement beams, wherein one measurement beam is partially reflected by the outer interface of the protective glass, and the other measurement beam is coupled out before the focussing of the laser optics.

The same information for tracking the laser beam focus 79 as in the form of embodiment shown in FIG. 31 can also be obtained using an optical system with only one focal position sensor. A corresponding form of embodiment of the optical system is shown in FIG. 32. Here, a beam 88 partially-reflected from the laser beam 70 by the beam splitter 63, which is coupled out on the other side of the beam splitter 63, is reflected back by means of a reflecting, or partially-reflecting, element 87, which is arranged at the exit opposite the focal position sensor, transits the beam splitter 63, and is received as a second measurement beam 50 by the focal position sensor. Thus, the focal position sensor here receives the measurement beams 40 and 50 superimposed on the same optical axis 39.

Figure 33:
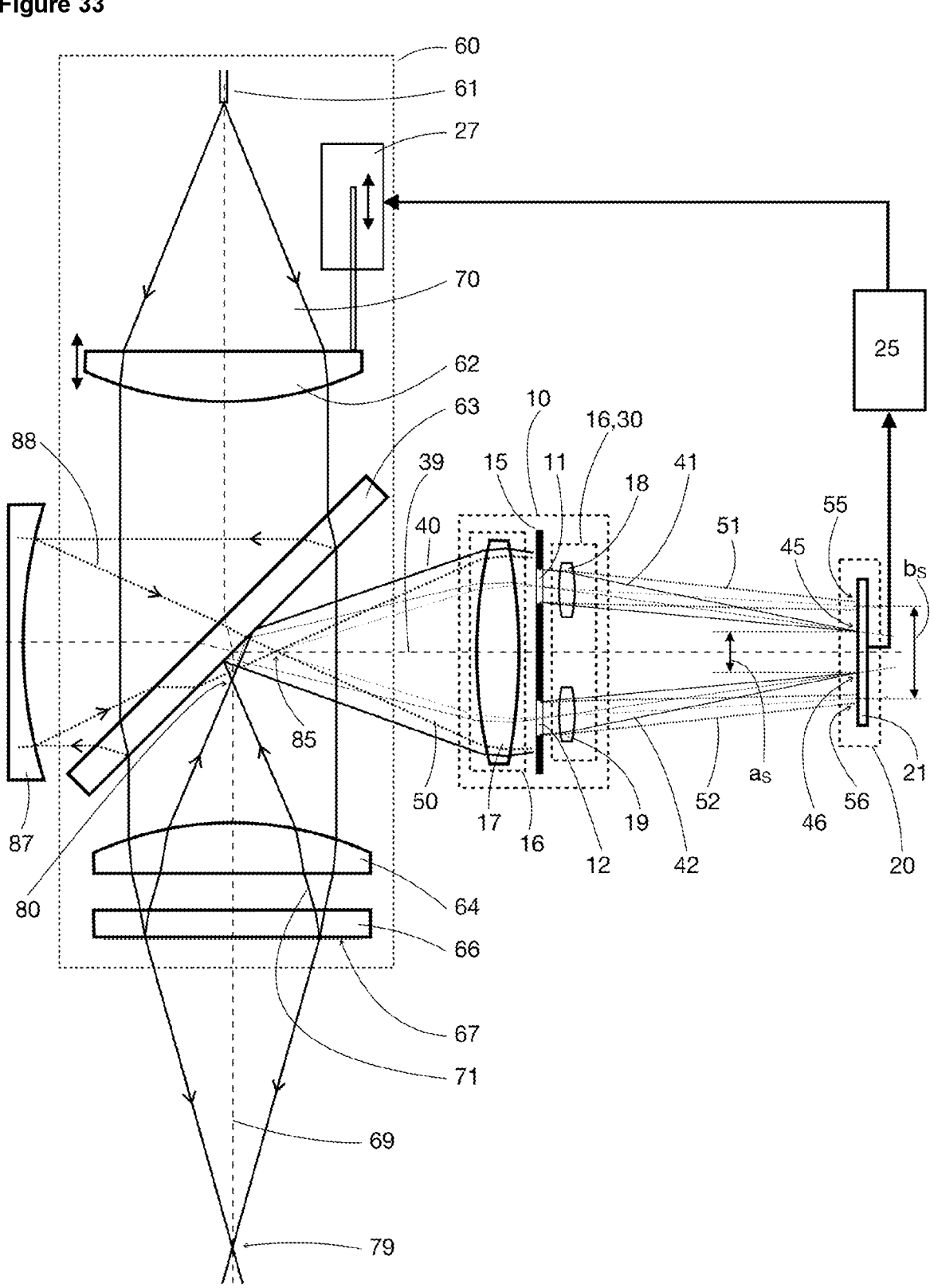
FIG. 33 shows a schematic illustration of an optical system with a laser optics and a focal position sensor. In this example of embodiment, the focal position sensor receives two superimposed measurement beams similar to the example in FIG. 32, wherein one measurement beam is partially reflected by the interface surface of the protective glass and the other measurement beam is coupled out before the focussing of the laser optics. The superposition of the measurement beams is carried out here in such a way that the intermediate foci of the measurement beams are close to each other.

A further form of embodiment of an optical system, in which the focal position sensor receives two measurement beams 40 and 50, each of which has passed through different paths in the laser optics 60, is shown in FIG. 33. The difference from the form of embodiment in FIG. 32 is that the reflection at the partially-reflecting element 87 here does not take place at a plane surface, but rather at a surface that is curved, for example concavely. This creates an intermediate focus 85 in the second measurement beam 50, the position of which can be placed in the vicinity of the intermediate focus 80 from the first measurement beam 40. As a result, the positions and dimensions of the beam spots 45, 46, 55, 56 formed by the two measurement beams 40 and 50 do not differ so strongly from each other, which simplifies the configuration of the focal position sensor.

In the forms of embodiment of the optical system shown in FIGS. 32 and 33, a focal position sensor can also be used that is further improved for the evaluation of two superimposed measurement beams, as shown and explained, for example, in FIGS. 22 and 25.

Figure 34:
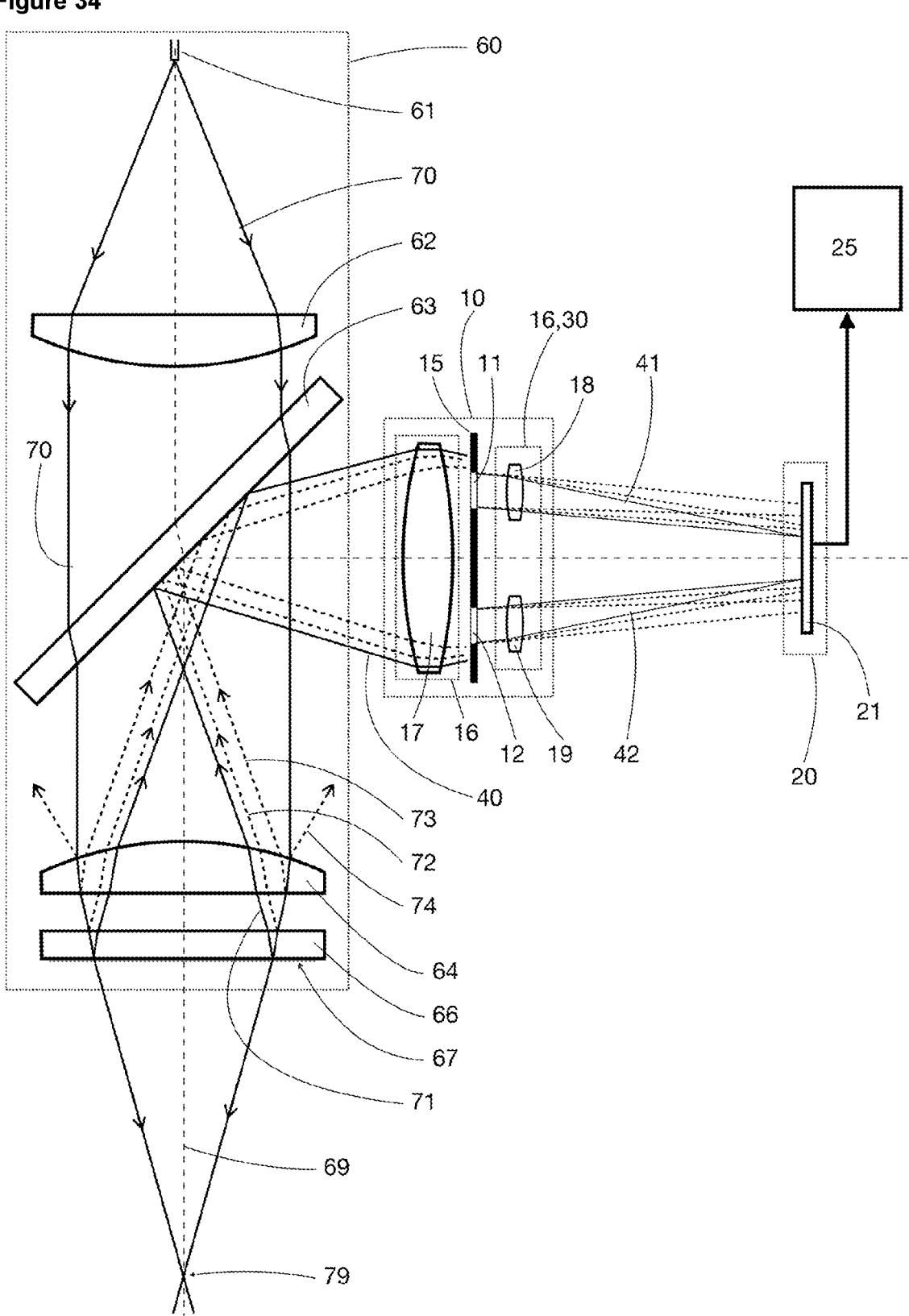
FIG. 34 shows a schematic illustration of an optical system with a laser optics and a focal position sensor. The figure shows further partial reflections from interfaces of a plurality of elements of the laser optics, which are typically present in the laser optics. The focal position sensor therefore receives a plurality of superimposed measurement beams which are partially reflected from the various interfaces of the optical elements of the laser optics.

FIG. 34 shows that other, that is to say, a plurality of, partially-reflected beams can also be coupled out from a laser optics 60 as measurement beams for the focal position sensor. In principle, all interfaces of the optical elements in the focussing region of the laser optics 60 can be used for the generation of partially-reflected beams. From the last interface 67 of the laser optics 60, which is here the outer surface of the protective glass 66, a first partially-reflected beam 71 is generated. From the inner surface of the protective glass 66, a second partially-reflected beam 72 is generated. From the outer interface of the focussing optics 64, which here is a planar surface, a third partially-reflected beam 73 is generated. Finally, a fourth partially-reflected beam 74 is generated from the inner curved interface of the focussing optics 64. In general terms, the partially-reflected beams 71, 72, 73, 74 have different axial (intermediate) focal positions and can therefore be evaluated separately by the focal position sensor.

Figure 35:
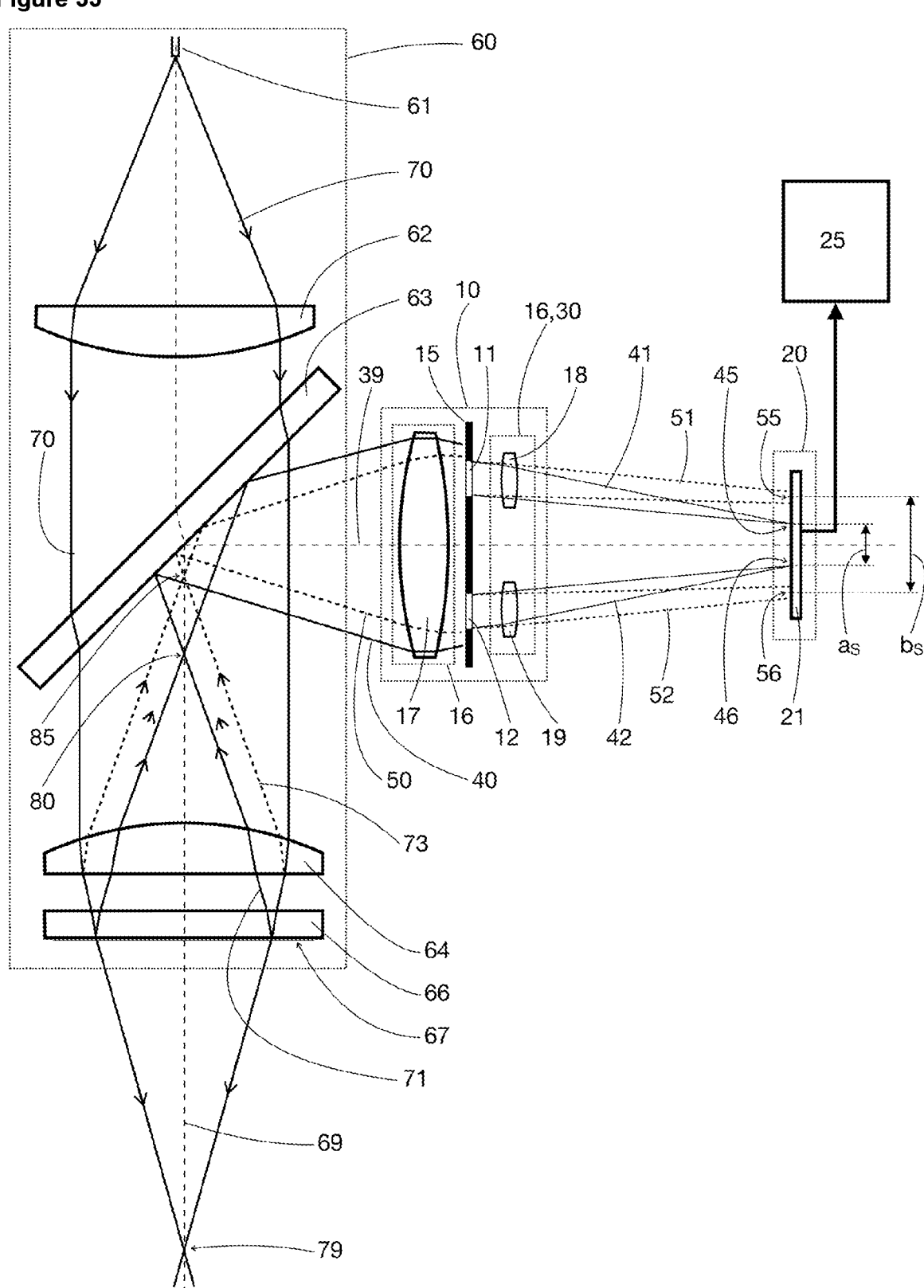
FIG. 35 shows a schematic illustration of an optical system with a laser optics and a focal position sensor. In this example of embodiment, the focal position sensor receives two superimposed measurement beams, which are generated in particular by an interface of the protective glass and by an interface of the focussing lens of the laser optics. When evaluating the beam spot positions in the focal position sensor, the effect of the protective glass on the change in focal position can thus be separated.

For example, it can be advantageous to evaluate in particular the first partially-reflected beam 71 from the protective glass 66. as well as the third partially-reflected beam 73 from the plane surface of the focussing optics 64, as shown in the form of embodiment of the optical system in FIG. 35. This allows the influence of the thermal lensing of the protective glass 66 to be separated out. This is advantageous because the protective glass 66 is exposed to the laser material processing, and contamination (smoke, spatter, gases) can cause the absorption of the protective glass 66, and thus the thermal lensing caused by the protective glass 66 to increase significantly over time. This can then be detected by the focal position sensor, and used not only to readjust the laser beam focus 79, but also to provide a signal to recommend a protective glass change. This form of embodiment can be particularly advantageous if a very thin protective glass 66 is used, and therefore the beams 71 and 72 partially-reflected from the two interfaces of the protective glass 66 result in beam spots on the detector unit 20 that are so close together that they are partially superimposed, and cannot be evaluated separately in a simple manner. The partially superimposed beam spots can then be interpreted as a combined beam spot, and the lateral position of the combined beam spot can be determined. With the additionally evaluated beam spots generated by the partially-reflected beam 73 of the focussing optics interface, information is then nevertheless available that is not affected by the thermal lensing of the protective glass 66, so that the thermal lensing of the protective glass can be separated out in the evaluation.

Figure 36:
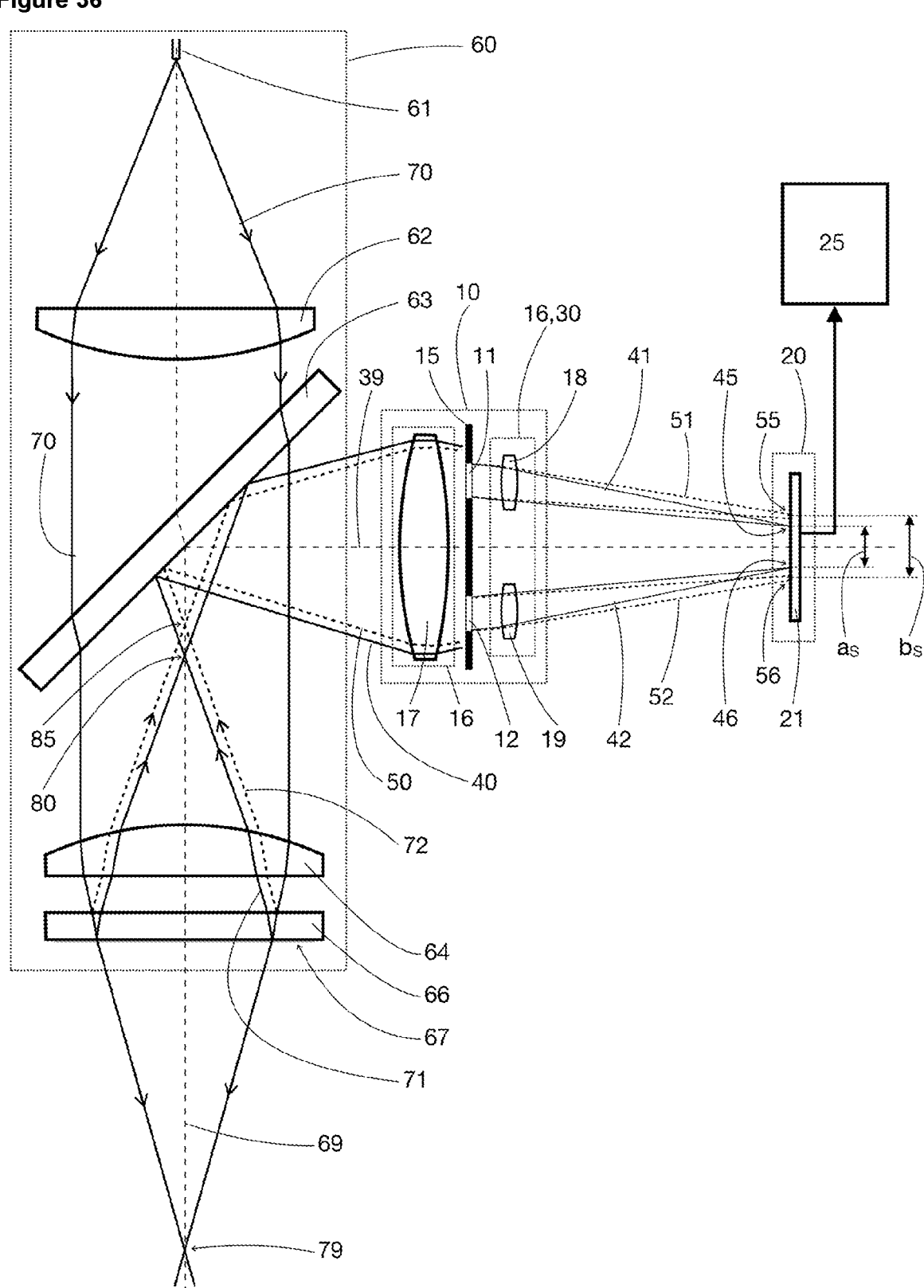
FIG. 36 shows a schematic illustration of an optical system with a laser optics and a focal position sensor similar to the example of FIG. 35. In this example of embodiment, the focal position sensor receives two superimposed measurement beams, which are generated in particular from the outer and the inner interfaces of the protective glass. When evaluating the beam spot positions in the focal position sensor, the effect of the protective glass on the change in focal position can thus also be separated.

If the protective glass 66 has a sufficient thickness, a form of embodiment of the optical system as shown in FIG. 36 can then advantageously be used. The form of embodiment is identical to the form of embodiment shown in FIG. 35 and differs only as to which partially-reflected beams are evaluated by the focal position sensor. In particular, the partially-reflected beams 71 and 72, which are generated by the outer interface 67 of the protective glass, and by the inner interface of the protective glass 66, are used here. Since the beam 72 partially-reflected from the inner interface of the protective glass 66 does not pass through the protective glass 66, information is available that is not affected by the thermal lensing of the protective glass 66, so that the thermal lensing of the protective glass 66 can be separated out in the evaluation. For purposes of imaging spatially separated beam spots on the detector unit 20, a thickness of the protective glass of a few millimetres is sufficient, for example a thickness of at least 3 mm.

Figure 37:
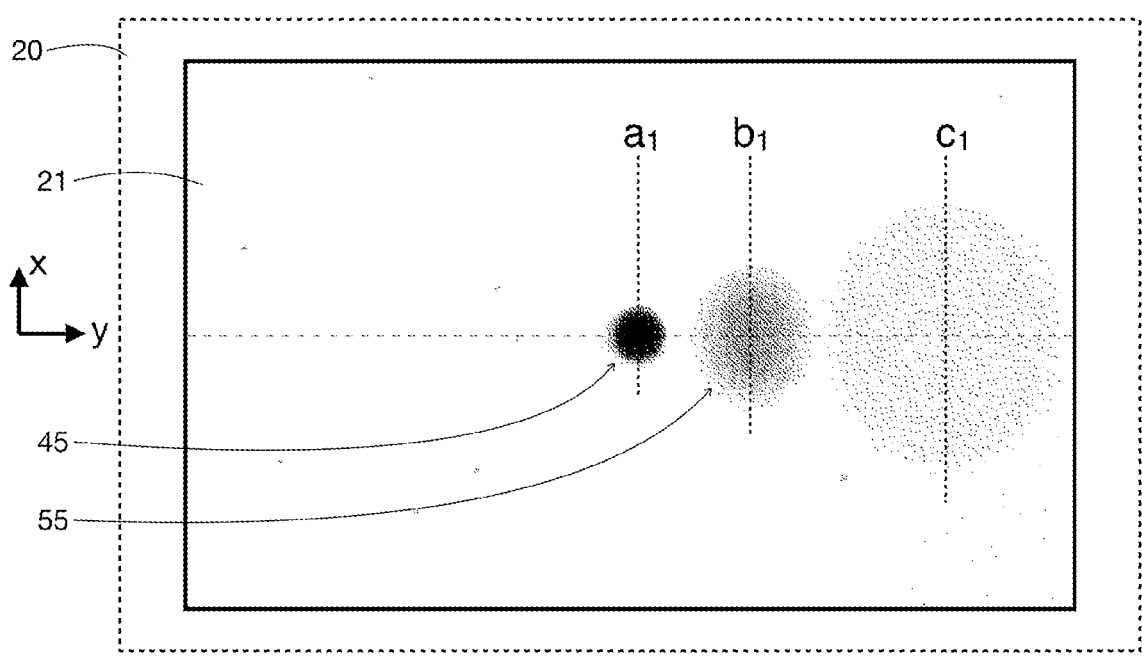
FIG. 37 shows an illustration of an intensity distribution on the detector of the focal position sensor simulated with an optics calculation program for an optical system according to FIG. 34, using only the beam spots generated by the first selection device.

FIG. 37 shows an illustration of an intensity distribution on the detector 21 of the focal position sensor simulated with an optics calculation program for an optical system according to FIG. 34. Here the collimator optics 62 have a focal length of 100 mm, and the focussing optics have a focal length of 150 mm. The protective glass has been simulated with a thickness of 4 mm. In the focal position sensor, only the beam spots generated by the first selection device 11 have been used and illustrated. In the focal position sensor, a distance zos between the partial beam imaging device 10 and the detector unit 20 of approximately 200 mm has been simulated. The simulation shows three distinct beam spots with different intensities, different sizes, and different positions on the detector. The most intense and smallest beam spot 45 with the lateral position $a_1$ belongs to the partially-reflected beam 71 generated by the outer interface 67 of the protective glass 66. The beam spot 55 of medium intensity and size with the lateral position $b_1$ belongs to the partially-reflected beam 72 generated by the inner interface of the protective glass 66. Finally, a third beam spot with the lateral position ci can be seen, which has a low intensity and is very large in comparison. This beam spot belongs to the partially-reflected beam 73 generated by the planar interface of the focussing optics 64.

Figure 38:
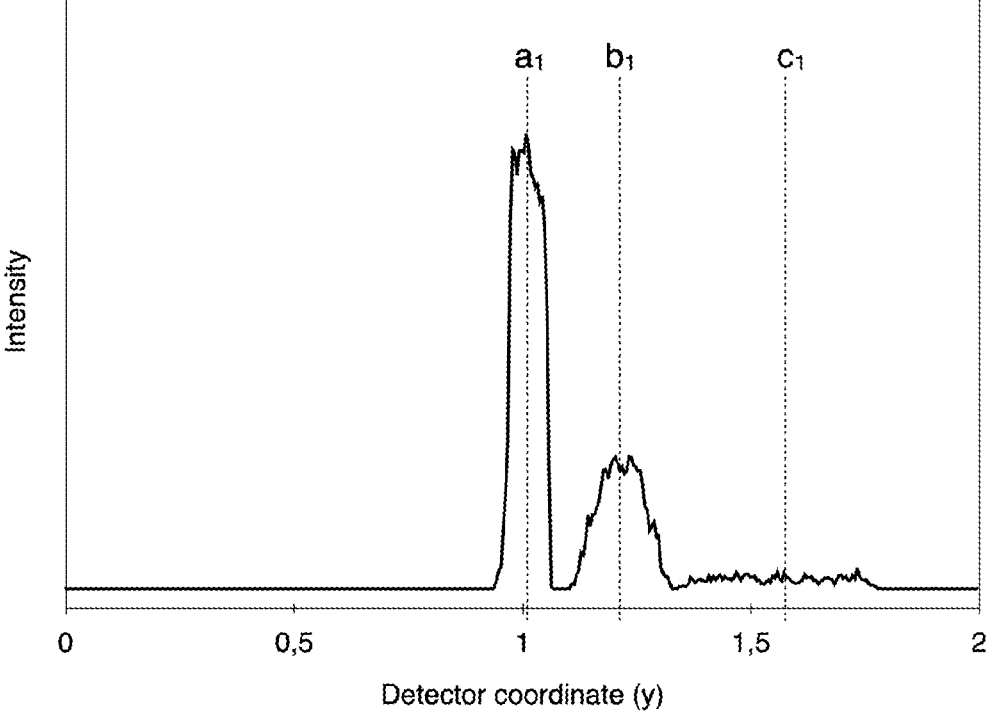
FIG. 38 shows an illustration of a section through the simulated intensity distribution of FIG. 37.

FIG. 38 shows a section through the simulated intensity distribution of FIG. 37.

Figure 39:
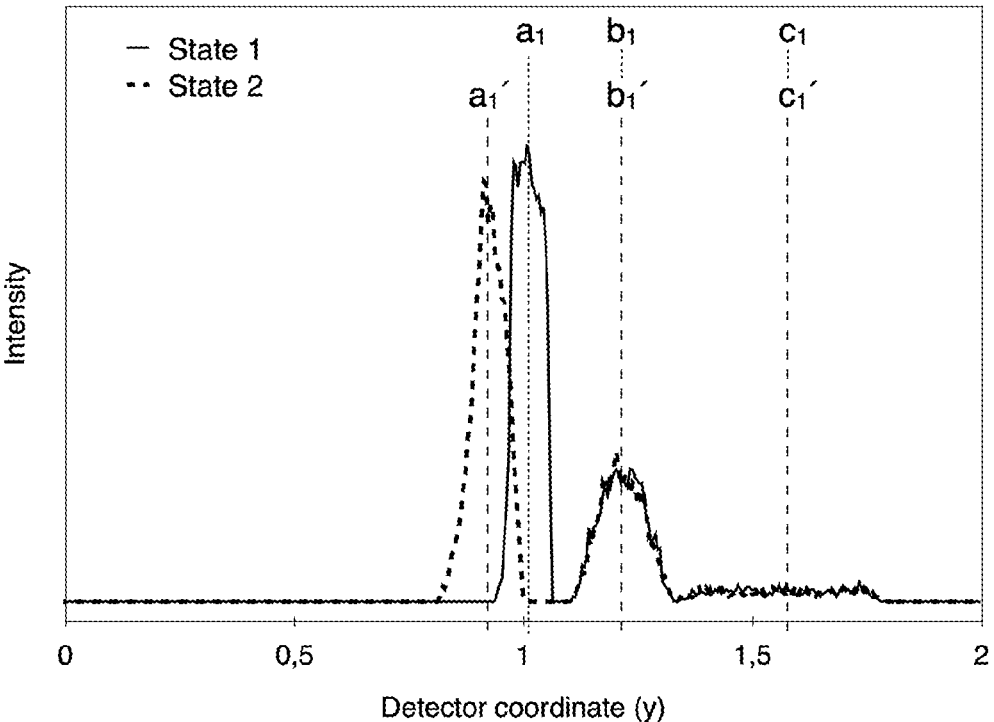
FIG. 39 shows an illustration of two simulated intensity distributions for two states of the laser optics, wherein a thermal focus shift in the protective glass has been simulated in the second state.

FIG. 39 shows an illustration of two simulated intensity distributions for two states of the laser optics 60. The intensity distribution of state 1, illustrated by a solid curve, corresponds to the laser optics 60 without thermal focus shift. The intensity distribution of state 2, illustrated by a dashed curve, corresponds to the laser optics 60, wherein a focus shift has been simulated only in the protective glass 66. The simulated focus shift in the protective glass results in an axial shift of the laser beam focus 79 of about 1 mm. As expected, it can be seen in the intensity distribution of state 2 that the beam spot position $a_1'$ belonging to the outer interface is significantly displaced laterally with respect to the original position $a_1$ of state 1, while the other beam spot positions are unchanged. This is to be expected, since the partially-reflected beams 72 and 73 from the inner interface of the protective glass 66 and from the plane surface of the focussing optics 64 have not passed through any element with a focus shift.

Figure 40:
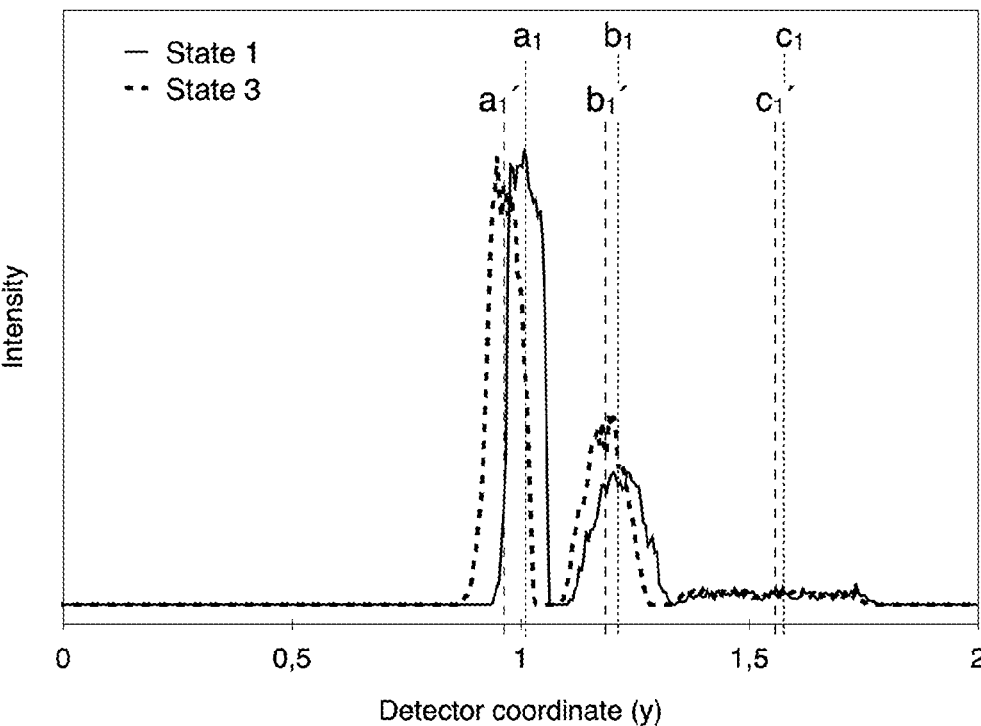
FIG. 40 shows an illustration of two simulated intensity distributions for two states of the laser optics, wherein in the second state a thermal focus shift has been simulated in all elements of the laser optics.

FIG. 40 shows another illustration of two simulated intensity distributions for two states of the laser optics 60. The intensity distribution of state 1, illustrated by a solid curve, corresponds to the laser optics 60 without a thermal focus shift (as in FIG. 39). The intensity distribution of state 3, illustrated by a dashed curve, corresponds to the laser optics 60 with a small focus shift simulated in all elements of the laser optics 60, that is to say, in the collimator optics 62, in the beam splitter 63, in the focussing optics 64, and in the protective glass 66. The individual focus shift contributions were chosen for the simulation such that the total focus shift of the laser optics 60 results in an axial shift of the laser beam focus 79 of about 1 mm. Comparing now the two intensity distributions, it can be seen that all three lateral positions of the three beam spots have been displaced by different amounts. This is also as expected, since all of the partially-reflected beams 71, 72, and 73 have each undergone a different number of focus shift contributions.

Furthermore, the evaluations of the beam spot positions of the simulated states 2 and 3 from FIGS. 39 and 40 show that accurate conclusions can be drawn from the differently sized lateral displacements of the multiple back reflections, both concerning the size of the axial displacement of the laser beam focus 79 and also concerning the cause of the focus shift, that is to say, which elements provide contributions of which size to the focus shift. This enables both accurate tracking of the laser beam focus 79 and detection of an excessively dirty protective glass.

Figure 41:
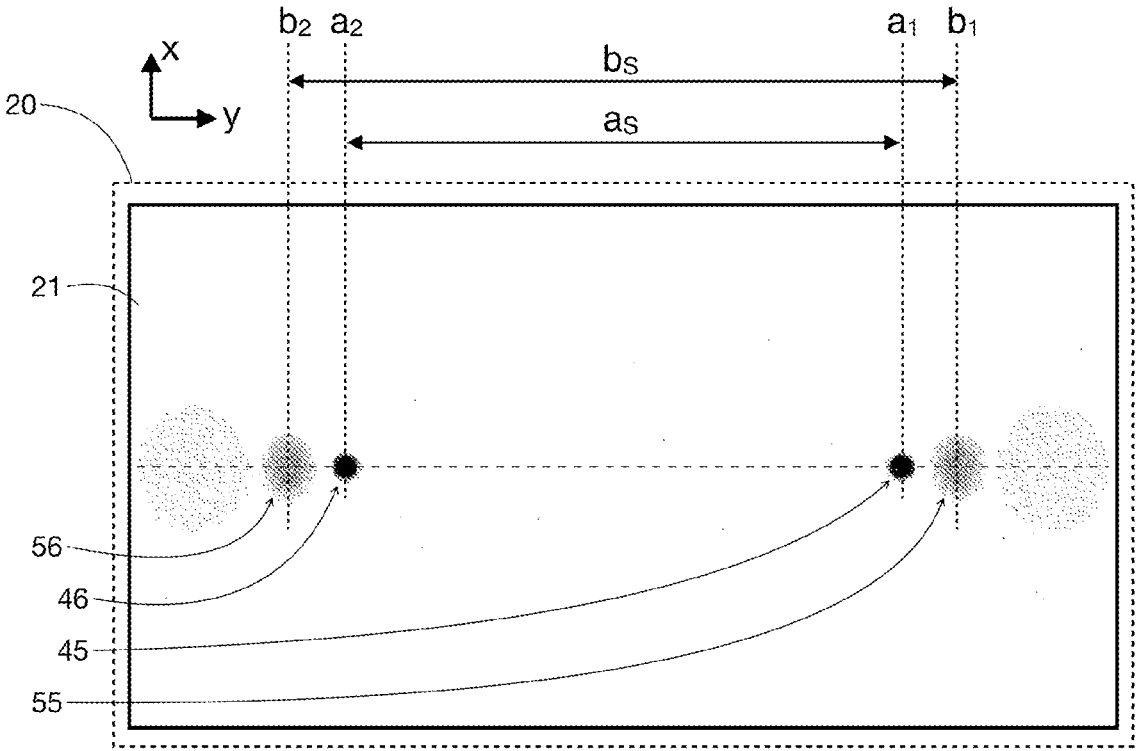
FIG. 41 shows an illustration of an intensity distribution on the detector of the focal position sensor for an optical system according to FIG. 34, simulated with an optical calculation program, wherein beam spots are generated by the first and the second selection devices.

FIG. 41 shows in principle the same simulation as FIG. 37, except that here the focal position sensor is equipped with a partial beam imaging device 10 comprising two selection devices 11, 12. As a result, beam spots 46 and 56 are formed on the detector in addition to beam spots 45 and 55 as mirror images of the latter. The evaluation in this case can therefore be based not only on the beam spot positions $a_1$ and $b_1$, but additionally also on the beam spot positions $a_2$ and $b_2$. Additionally or alternatively, the beam spot separation distances as and bs can also be evaluated.

Figure 42:
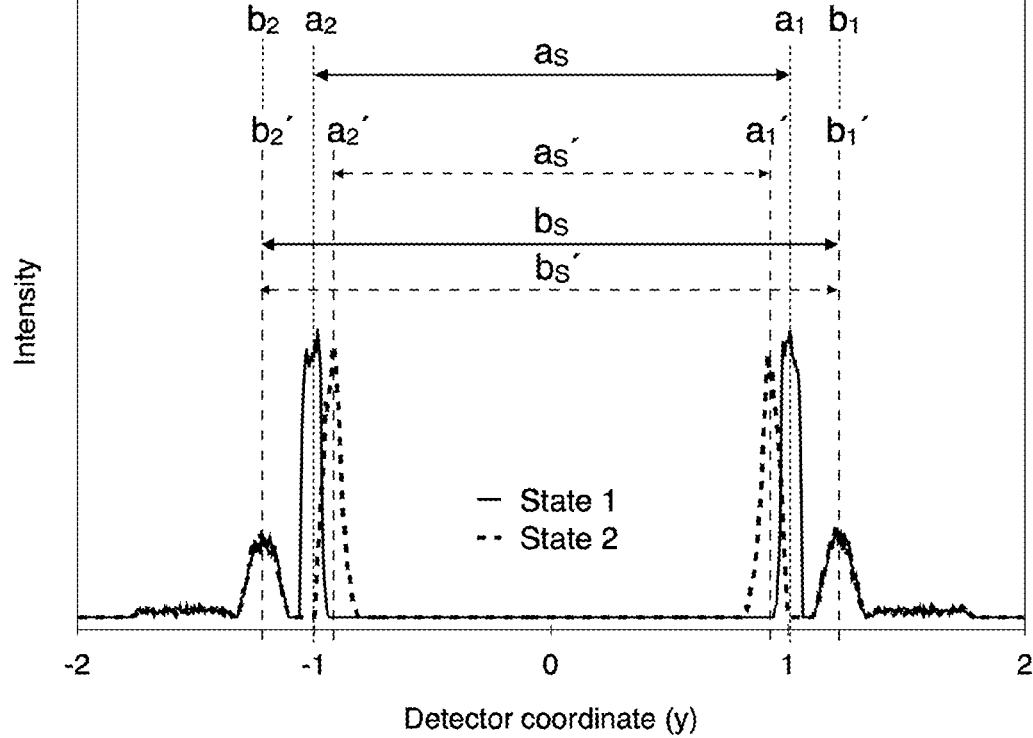
FIG. 42 shows an illustration of sections through the simulated intensity distribution of FIG. 41 for two states of the laser optics, wherein in the second state a thermal focus shift in the protective glass has been simulated. The evaluation can be improved by determining the separation distances between pairs of beam spots, each of which is generated by the same measurement beam.

FIG. 42 shows in section the intensity curve of the simulated intensity distribution of FIG. 41. The dashed curve of state 2 shows, as in FIG. 39, the simulation of a thermal focus shift only in the protective glass 66. Consequently, only the beam spot separation distances as, $a_S'$ change from state 1 to state 2, while the beam spot separation distances $b_S$, $b_S'$ remain unchanged.

Figure 43:
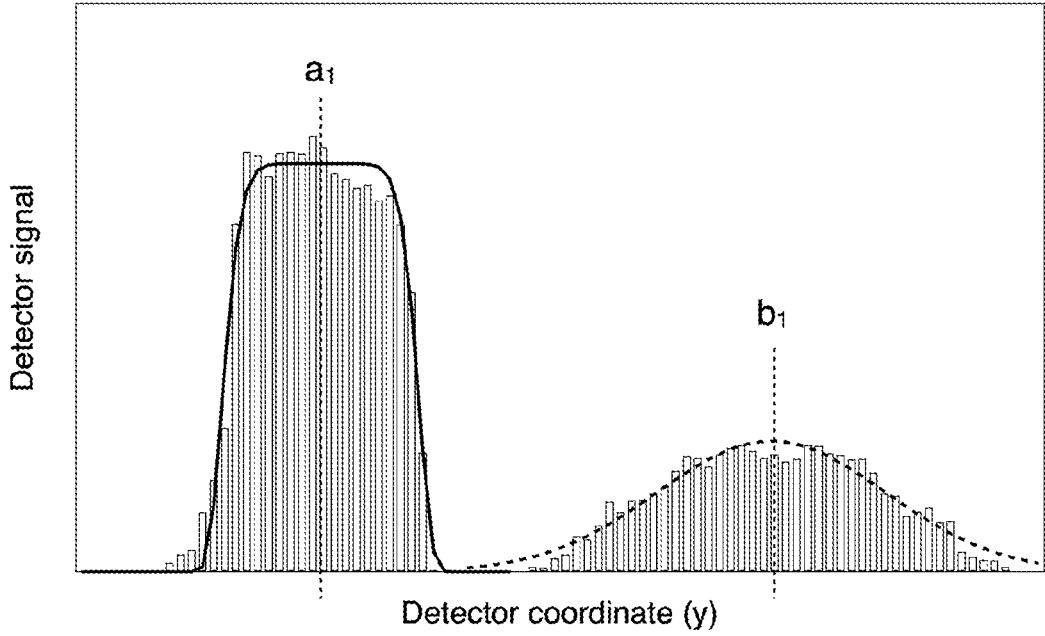
FIG. 43 shows an illustration explaining the determination of the lateral positions of the beam spots. In the example shown, a setpoint intensity distribution is adapted to the registered intensity distribution to determine the beam spot positions at each beam spot.

FIG. 43 shows a section of a simulated intensity distribution on the detector to illustrate one of the possible methods for determining the beam spot positions. One of the possible methods is to fit a setpoint intensity distribution to the registered intensity distribution. The beam spot position is then obtained from the centre of the fit distribution. In FIG. 43, the dashed curve shows an optimal fit to the beam spot distribution with the position $b_1$. The dashed fit function in this example is a Gaussian distribution. The other distribution shown with the solid curve is an optimal fit to the beam spot distribution with the position $a_1$. For the solid curve, a Gaussian distribution with a higher exponent, a so-called super-Gaussian distribution, was used. By means of the position determination by fit functions shown here, within certain limits an evaluation of beam spots is even possible when these are not completely spatially separated from each other, but partially overlap.

DETAILED DESCRIPTION

There exists a need for an improved focus sensor, which is able to evaluate multiple superimposed light beams or back reflections. There also exists a need for improved systems for focal position control, and for tracking the laser beam focus in laser optics.

The present disclosure is therefore based on the object of creating a system for focal position control with improved properties.

For this purpose, a beam analysis device for determining a light beam state is proposed, in particular for determining a focal position of the light beam. The beam analysis device comprises a partial beam imaging device 10, a detector unit 20, and an evaluation unit 25.

The partial beam imaging device 10 is configured to receive at least a first measurement beam 40 that is radiated along an optical axis 39. The measurement beam 40 can be the light beam itself, or can be a beam that is coupled out from a light beam or a laser beam, in an advanced device. The partial beam imaging device 10 comprises at least a first selection device 11, by means of which a first partial aperture region is excised from the first measurement beam 40. By propagation of the radiation of the excised first partial aperture region, the first partial beam 41 is formed. The partial beam imaging device 10 further comprises an imaging device 16 with at least one imaging optical element 17. By means of the imaging device 16, the first partial beam 41 is imaged onto the detector unit 20. By the imaging of the first partial beam 41 onto the detector unit 20, a beam spot 45 is generated on the detector unit 20. The beam spot 45 can be a focus of the partial beam 41, or a cross-section of the partial beam 41 in the vicinity of a waist of the partial beam 41. In either case, the width of the beam spot 45 is substantially smaller than the width of the first partial aperture region.

The detector unit 20 is arranged behind the partial beam imaging device 10 at a distance zos from the partial beam imaging device 10. The detector unit 20 comprises at least one, at least one-dimensionally spatially-resolving, light-sensitive first detector 21. This can be a line sensor, a camera chip such as a CCD camera or a CMOS camera, or any other pixel-based semiconductor detector. The detector unit 20 captures the intensity distribution of the first beam spot 45.

The evaluation unit 25 is connected to the detector unit 20, that is to say, it receives and processes the signals of the detector unit 20. By means of the evaluation unit 25, the lateral position $a_1$ of the beam spot 45 on the detector unit 20 is determined from the registered intensity distribution. By means of the evaluation unit 25, changes in the lateral position $a_1$ of the beam spot 45 on the detector unit 20 are further determined. The changes in the lateral position of the beam spot are in particular changes over time. That is to say, the evaluation unit 25 can be configured to compare currently determined beam spot positions with other, previously determined or stored beam spot positions, and/or to determine displacement values from the position changes.

The determination of the lateral position of the beam spot can be done in several possible ways. One possibility is to calculate the centroid or the mean value of the intensity distribution of the beam spot.

Another possibility is to determine the edge of the beam spot, for example, by attaining the signal intensity of a defined threshold. In the second step, the geometric centre can be determined on the basis of the determined edge, or, in the case of an irregular contour, the centroid of the surface area can be calculated.

Another possibility is to adapt a setpoint intensity distribution or a fit function to the registered intensity distribution of the beam spot.

The beam analysis device is preferably configured to determine the focal position of a measurement beam. The axial position of the focus or the intermediate focus 80 of the measurement beam 40 is correlated with the lateral position of the beam spot 45 on the detector unit 20.

The first selection device 11 is arranged off-centre with respect to the optical axis 39. The centre of the first selection device 11 has a lateral or radial distance $r_1$ from the optical axis 39. The selection device 11 and thus the first partial aperture region has a width $d_1$ in the radial direction.

It is envisaged that the radial distance $r_1$ is at least as great as the width $d_1$ of the selection device 11. This means that the edge of the first partial aperture region excised from the selection device 11 is spaced apart from the optical axis by at least the half-width, $d_{1/2}$, of the selection device 11, and the first partial aperture region extends further radially outwards from there. Thus, the paraxial region around the optical axis 39 is not included in the first partial aperture region.

The first selection device 11 can be implemented in different ways. For example, the first selection device 11 can be configured as a rim of a partial aperture lens. The partial aperture lens can also be the imaging optical element 17 of the imaging device 17. The first selection device 11 can also be configured as a rim of a partial aperture deflection mirror. The first selection device 11 can also be configured as an aperture in an aperture device 15.

It can be envisaged that the width $d_1$ of the selected first partial aperture region of the first measurement beam 40 is at most ⅓ of the width of the full aperture of the measurement beam 40 in the plane of the partial beam imaging device 10.

It can be envisaged that the distance zos between the partial beam imaging device 10 and the detector unit 20 is within a range from 20 mm to 500 mm. Preferably, the distance zos can be within a range from 40 mm to 250 mm.

To achieve the object as set, optical systems are also proposed in which the beam analysis device, as a focal position sensor, receives at least one measurement beam 40, which as a partially-reflected beam is coupled out from a laser optics 60. For this purpose, numerous forms of embodiment are specified and explained in FIGS. 26 to 36 and the associated figure descriptions.

The advantageous properties of the focal position sensor according to the present disclosure are achieved by the fact that a small partial aperture region is excised from the received light beam, that is to say, the measurement beam, by means of the selection device, which partial aperture region is substantially smaller than the entire aperture of the measurement beam, and by the fact that the partial aperture region is excised in an off-centre manner, that is to say, in particular is located outside the optical axis of the measurement beam. Thus, it is precisely the paraxial region of the measurement beam around the optical axis that does not contribute to the imaging of the partial beam onto the detector. This leads to the fact that changes in the axial focal position of the measurement beam are converted into a lateral displacement of the detected beam spot, as in the case of a triangulation. In particular, the direction of the axial focal position change can be detected from the direction of the lateral displacement of the beam spot. Furthermore, this leads to the fact that when a plurality of measurement beams with axially different focal positions are received, the associated beam spots are spatially separated from each other on the detector, and not only do not interfere with each other, but can even be used specifically for an improved evaluation.

An essential advantage of the present disclosure is that the measuring principle is based on the determination of positions. The position of a beam spot can be determined, for example, by calculating the centroid of the intensity distribution, that is to say, the first moment of a beam distribution. The determination of positions and their separation distances from each other is largely independent of, for example, the level of a constant background, which can be caused by scattered light and/or noise. As a result, this principle of measurement is less error-prone than other methods, which are usually based on the determination of a beam diameter, that is to say, the second moment of a beam distribution, and its alteration, because the determination of a second moment is relatively sensitive to changes in the level of the background.

The present disclosure has numerous advantages:

The focal position sensor has a simple design, is robust and requires no moving elements.

The focal position sensor and the beam analysis method are particularly suitable for the reception of a plurality of superimposed measurement beams, and for the evaluation of multiple back reflections from a laser optics.

The focal position sensor and the beam analysis method are insensitive to variations in the beam quality of the laser radiation.

The focal position sensor and the beam analysis method allow a particularly accurate determination of a focal position, since the latter is based on the determination of positions of beam spots. and not on a determination of diameters or extents of beam spot distributions, and is therefore largely insensitive to parasitic light, offset, and noise of the detector.

The determination of focal position changes is possible in real time, that is to say, the determination takes place during laser material processing and requires only a fraction of the typical time constant of focal position changes due to thermal focus shift.

The present disclosure can be advantageously developed further in a wide variety of ways, without departing from the scope and object of the present disclosure. Further designs and possible embodiments are shown in the figures and explained in the figure descriptions, although the present disclosure is not limited to the forms of embodiment shown. Various features or forms of embodiment shown in the figures can also be combined, so as to arrive at further possible forms of embodiment of the present disclosure.

For the purposes of this disclosure, light is electromagnetic radiation with a wavelength in the range from 0.1 $\mu$m to 10 $\mu$m, preferably in the range from 0.3 $\mu$m to 3 $\mu$m, and in particular in the range from 0.5 $\mu$m to 1.5 $\mu$m.

For the purposes of this disclosure, laser radiation is electromagnetic radiation in the range from 0.5 $\mu$m to 1.5 $\mu$m and with a power of at least 100 W, preferably with a power of at least 500 W.

The invention claimed is:

1. An optical system, comprising:

a laser optics;

a beam analysis device for determining a state of a laser beam, wherein the laser optics is configured to generate a laser beam focus and comprises:

an interface of an optical element of the laser optics for generating a partially-reflected beam from the laser beam and for propagating the partially-reflected beam counter to a direction of the laser beam, and a partially-reflecting beam splitter for coupling out a measurement beam from the partially-reflected beam towards the beam analysis device, wherein the partially-reflected beam or the measurement beam has an intermediate focus, and wherein the beam analysis device is configured to receive the measurement beam coupled out by way of the beam splitter and comprises:

a partial beam imaging device, which is configured to receive a first measurement beam, and which comprises at least a first selection device for forming a first partial beam from a first partial aperture region of the first measurement beam, and wherein the partial beam imaging device further comprises an imaging device with at least one imaging optical element, a detector unit, with at least one at least one-dimensionally spatially-resolving light-sensitive detector, which is arranged at a distance (zos) from the partial beam imaging device, and an evaluation unit that is connected to the detector unit and is configured to process signals from the detector unit, wherein the first selection device is arranged off-centre with respect to an optical axis for irradiating the first measurement beam, wherein the partial beam imaging device is configured to image the first partial beam for generating a first beam spot onto the detector unit, wherein the detector unit is configured to capture an intensity distribution of the first beam spot, wherein the evaluation unit is configured to determine a lateral position ($a_1$, $a_{1'}$) of the first beam spot, and wherein the evaluation unit is configured to determine changes in the lateral position ($a_1$, $a_1'$) of the first beam spot over time, wherein the beam analysis device constitutes a focal position sensor configured for monitoring an axial focal position of the laser beam focus by monitoring the focal position of the intermediate focus, wherein changes in an axial focal position of the laser beam focus and hence of the focal position of the intermediate focus are correlated with the changes in the lateral position of the first beam spot on the detector unit, wherein the optical system is configured such that by virtue of the partial reflection at the interface, a focal position of the intermediate focus is optically coupled to a focal position of the laser beam focus, wherein changes in the focal position of the laser beam focus simultaneously cause an alteration in the focal position of the intermediate focus, wherein the interface for generating the partially-reflected beam is the interface last transited by the laser beam before the laser beam exits the laser optics.

2. The optical system according to claim 1, wherein the first selection defines a first partial aperture region, wherein a centre of the first partial aperture region is located at a radial distance ($r_1$) from the optical axis in a radial direction that is perpendicular to the optical axis, wherein a value of the radial distance ($r_1$) is at least as large as a value of a width ($d_1$) of the first partial aperture region along the radial direction.

3. The optical system according to claim 1, wherein the evaluation unit is configured to determine the lateral position of the first beam spot by one or more of: calculating a centroid of the intensity distribution of the beam spot, determining an edge or a peripheral contour of the beam spot, determining a geometric centre of the beam spot, and adapting a setpoint intensity distribution to the captured intensity distribution of the beam spot.

4. The optical system according to claim 1, wherein the partial beam imaging device furthermore comprises at least a second selection device for forming a second partial beam from a second partial aperture region of the first measurement beam, and wherein the partial beam imaging device is configured to image the second partial beam onto the detector unit so as to generate a second beam spot.

5. The optical system according to claim 4, wherein the second selection device defines a second partial aperture region, wherein a centre of the second partial aperture region is located at a radial distance ($r_2$) from the optical axis in a radial direction that is perpendicular to the optical axis, wherein a value of the radial distance ($r_2$) is at least as large as a value of a width ($d_2$) of the second partial aperture region along the radial direction.

6. The optical system according to claim 4, wherein the first partial aperture region selected by the first selection device, and the second partial aperture region selected by the second selection device, are not contiguous, and wherein a distance ($r_1+r_2$) from a centre of the first partial aperture region to a centre of the second partial aperture region is at least as large as a sum of the widths ($d_1+d_2$) of the first and second partial aperture regions.

7. The optical system according to claim 6, wherein the detector unit is configured to capture an intensity distribution of the first beam spot and the second beam spot, wherein the evaluation unit is configured to identify at least the first beam spot and the second beam spots in the intensity distribution captured by the detector unit, and to determine the lateral positions of the first beam spot and the second beam spot.

8. The optical system according to claim 7, wherein the evaluation unit is configured to determine changes in the lateral positions of the first beam spot and the second beam spot or a beam spot separation distance between the lateral positions of the first beam spot and the second beam spot over time.

9. The optical system according to claim 1, wherein a partially-reflecting beam splitter is arranged in front of the partial beam imaging device for generating the measurement beam, wherein the partially-reflecting beam splitter is configured to couple out a defined beam component from a light beam or laser beam directed onto the beam splitter.

10. The optical system according to claim 1, wherein the laser optics comprises at least one further interface of an optical element of the laser optics for generating at least one further partially-reflected beam from the laser beam, wherein the partially-reflecting beam splitter is configured for coupling out the first measurement beam from the partially-reflected beam, and, in addition, an at least one second measurement beam from the at least one further partially-reflected beam towards the beam analysis device, wherein the beam analysis device is configured to receive the first measurement beam and the at least one second measurement beam coupled out by way of the beam splitter.

11. The optical system according to claim 10, wherein the partial beam imaging device is configured to receive the first measurement beam and the at least one second measurement beam, wherein the measurement beams are superimposed on the optical axis.

12. The optical system according to claim 11, comprising an element, which is reflecting or partially-reflecting and which is arranged at an exit of the beam splitter opposite to the beam analysis device, wherein the element is configured for reflecting a beam, which has been partially-reflected from the laser beam by the beam splitter towards the element, for transiting the beam splitter and being received as the at least one second measurement beam by the beam analysis device.

13. The optical system according to claim 1, wherein the laser optics is connected to a guiding machine, which is configured to adjust an axial position of a laser beam focus of the laser optics, and wherein a controller of the guiding machine is coupled to the evaluation unit for receiving data determined from the position of the first beam spot on the detector unit.

14. The optical system according to claim 1, wherein the laser optics includes an axially movable lens or lens group, and a translation device, wherein the position of the lens, or lens group is adjustable, and wherein the translation device is configured to control the position of the lens, or lens group, as a function of a value provided by the evaluation unit, which value is determined from the position of the first beam spot on the detector unit.

* * * * *